US012675800B2

(12) United States Patent     (10) Patent No.:    US 12,675,800 B2
    Russo et al.                 (45) Date of Patent:       Jul. 7, 2026

(54) APPARATUS AND METHOD FOR SELECTION OF A TRANSPORT

(71) Applicant: PITT-OHIO EXPRESS, LLC, Pittsburgh, PA (US)

(72) Inventors: Justine Russo, Pittsburgh, PA (US); Stephen Milcoff, Pittsburgh, PA (US)

(73) Assignee: PITT-OHIO EXPRESS, LLC, Pittsburgh, PA (US)

( * ) Notice:    Subject to any disclaimer, the term of this patent is extended or adjusted under 35 U.S.C. 154(b) by 0 days.

(21) Appl. No.: 18/975,112

(22) Filed:    Dec. 10, 2024

(65)            Prior Publication Data

US 2025/0238814 A1      Jul. 24, 2025

Related U.S. Application Data

(63) Continuation of application No. 18/420,081, filed on Jan. 23, 2024, now Pat. No. 12,182,826.

(51) Int. Cl.
    *G06Q 30/018*      (2023.01)
    *G06Q 10/08*       (2024.01)
(52) U.S. Cl.
    CPC ........... *G06Q 30/018* (2013.01); *G06Q 10/08* (2013.01)
(58) Field of Classification Search
    CPC ............................. G06Q 30/018; G06Q 10/08
    USPC ........................................................ 705/332
    See application file for complete search history.

(56)            References Cited

U.S. PATENT DOCUMENTS

| 2012/0173293 | A1 |   | 7/2012 | Motley et al. |
| 2020/0200649 | A1 | * | 6/2020 | Ammoura ................. G07C 5/12 |
| 2022/0067751 | A1 | * | 3/2022 | Sanchez ........... G06Q 10/08345 |
| 2023/0065744 | A1 | * | 3/2023 | Cousins ................. G06Q 10/06 |

FOREIGN PATENT DOCUMENTS

| JP | 4538510 B2 | 9/2010 |
| WO | 2022251352 A1 | 12/2022 |

OTHER PUBLICATIONS

"Predicting Transportation Carbon Emission with Urban Big Data" Published by IEEE (Year: 2017).*
Ağulut, Ü. (2022). Forecasting of transportation-related energy demand and CO2 emissions in Turkey with different machine learning algorithms. *Sustainable Production and Consumption*, *29*, 141-157. https://doi.org/10.1016/j.spc.2021.10.001.

* cited by examiner

*Primary Examiner* — Zeina Elchanti
(74) *Attorney, Agent, or Firm* — Caldwell LLC

(57)            ABSTRACT

An apparatus for projected carbon emissions of a transport, the apparatus including a computing device configured to receive freight data associated with a transport request, determine one or more transport configurations as a function of the freight data, wherein each transport configuration of the one or more transport configurations includes a temporal element, generate a projected carbon emission for each transport configuration of the one or more transport configurations as a function of the freight data and a carbon projection module, receive a selection of the one or more transport configurations as a function of user input, receive real carbon data associated with the freight data from one or more sensors located on one or more transport carriers as a function of the selection and transmit a carbon departure as a function of the real carbon data and the projected carbon emission to a remote device.

20 Claims, 7 Drawing Sheets

605 Receiving, By At Least a Processor, Freight Data

610 Determining, By the At Least a Processor, One or More Transport Configurations 615 Generting, By the At Least a Processor, a Projected Carbon Emission 620 Receiving, By the At Least a Processor, a Selection 625 Receiving, By the At Least a Processor, Real Carbon Data 630 Transmitting, By the At Least a Processor, a Carbon Departure

600

APPARATUS AND METHOD FOR SELECTION OF A TRANSPORT

CROSS-REFERENCE TO RELATED APPLICATIONS

This application is a continuation of U.S. Non-Provisional patent application Ser. No. 18/420,081, filed on Jan. 23, 2024, entitled "APPARATUS AND METHOD FOR SELECTION OF A TRANSPORT," the entirety of which is incorporated herein by reference.

FIELD OF THE INVENTION

The present invention generally relates to the field of carbon emission calculations. In particular, the present invention is directed to apparatuses and methods for selection of a transport.

BACKGROUND

Current systems utilized to select transports based on projected carbon emissions lack accuracy due to many variables that are often ignored. In addition current systems utilized to track future carbon emissions do not provide the adequate tools necessary to make informed decisions in association with selection of transports.

SUMMARY OF THE DISCLOSURE

In an aspect, an apparatus for projected carbon emissions of a transport is described. Apparatus includes at least a processor and a memory communicatively connected to the at least a processor. The memory contains instructions configuring the processor to receive freight data associated with a transport request. The memory further contains instructions to determine one or more transport configurations as a function of the freight data, wherein each transport configuration of the one or more transport configurations includes a temporal element based on a projected transport journey having one or more transport routes, generate a projected carbon emission for each transport configuration of the one or more transport configurations as a function of the freight data, wherein generating the projected carbon emission includes receiving a plurality of transport routes, determining a projected carbon block for each transport route of the plurality of transport routes using historical route data, and generating the projected carbon emissions as a function of the plurality of projected carbon blocks, generate a carbon deviation as a function of the projected carbon emission for each transport configuration of the one or more transport configurations and route obstruction data, apply the carbon deviation to the projected carbon emission for each transport configuration of the one or more transport configurations, and output an integrated projected carbon emission for each transport configuration of the one or more transport configurations.

In another aspect, a method for projected carbon emissions of a transport is described. The method includes receiving freight data for an order for transport determining one or more transport configurations as a function of the freight data, wherein each transport configuration of the one or more transport configurations includes a temporal element based on a projected transport journey having one or more transport routes, generating a projected carbon emission for each transport configuration of the one or more transport configurations as a function of the freight data, wherein generating the projected carbon emission includes receiving a plurality of transport routes, determining a projected carbon block for each transport route of the plurality of transport routes, and generating the projected carbon emissions as a function of the plurality of projected carbon blocks, generating a carbon deviation as a function of the projected carbon emission for each transport configuration of the one or more transport configurations and route obstruction data, applying the carbon deviation to the projected carbon emission for each transport configuration of the one or more transport configurations, and outputting an integrated projected carbon emission for each transport configuration of the one or more transport configurations. These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for selection of a transport. In an embodiment, apparatus includes a computing device configured to receive freight data. In one or more embodiments, freight data may be received by a remote device. In one or more embodiments, apparatus is configured to determine one or more transport configurations and generate projected carbon emissions for each transport configuration. Apparatus is further configured to calculate real carbon data as a function of freight data and the selected transport configurations. In one or more embodiments, real carbon data may be used to iteratively train one or more models in order to increase the accuracy of projections in future iterations.

Aspects of the present disclosure can be used to generate projected carbon emissions for multiple transport configuration. Aspects of the present disclosure can be used to make informative decisions prior to selecting transport carriers for shipment of freight. Aspects of the present disclosure can also be used to determine real carbon data, wherein the projected carbon emission and the real carbon data may be compared to generate a carbon departure. This may done through at least the use of a carbon projected module. Exemplary embodiments illustrating aspects of the present disclosure are described below in the context of several specific examples.

Figure 1:
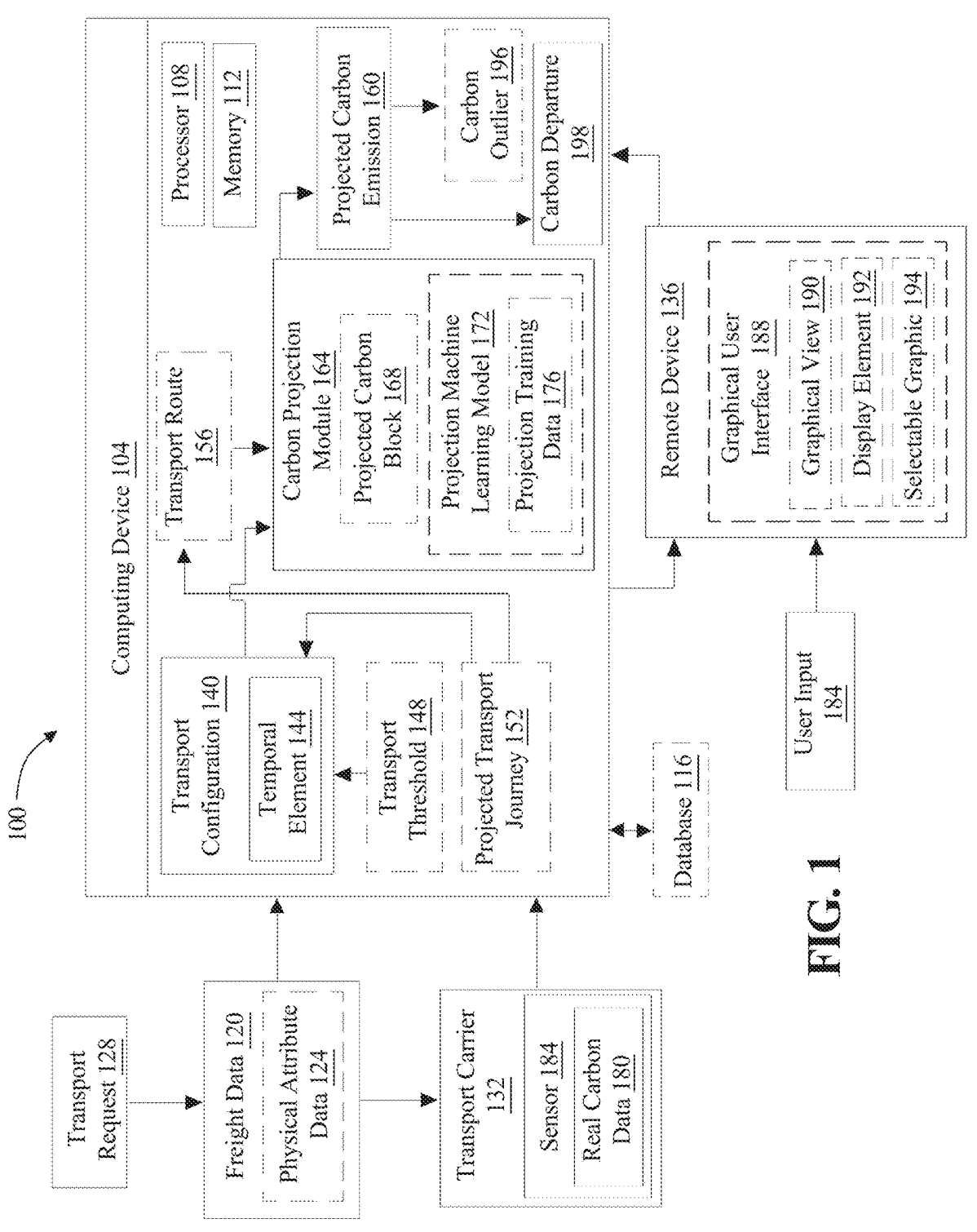
FIG. 1 is a block diagram of an exemplary embodiment of an apparatus for selection of a transport.

Referring now to FIG. 1, an apparatus 100 for selection of a transport is described. apparatus 100 includes a computing device 104. Apparatus 100 includes a processor 108. Processor 108 may include, without limitation, any processor 108 described in this disclosure. Processor 108 may be included in a and/or consistent with computing device 104. Computing device 104 may include any computing device as described in this disclosure, including without limitation a microcontroller, microprocessor, digital signal processor (DSP) and/or system on a chip (SoC) as described in this disclosure. Computing device 104 may include, be included in, and/or communicate with a mobile device such as a mobile telephone or smartphone. Computing device 104 may include a single computing device 104 operating independently or may include two or more computing devices operating in concert, in parallel, sequentially or the like; two or more computing devices may be included together in a single computing device 104 or in two or more computing devices. Computing device 104 may interface or communicate with one or more additional devices as described below in further detail via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device 104. Computing device 104 may include but is not limited to, for example, a computing device 104 or cluster of computing devices in a first location and a second computing device 104 or cluster of computing devices in a second location. Computing device 104 may include one or more computing devices dedicated to data storage, security, distribution of traffic for load balancing, and the like. Computing device 104 may distribute one or more computing tasks as described below across a plurality of computing devices of computing device 104, which may operate in parallel, in series, redundantly, or in any other manner used for distribution of tasks or memory 112 between computing devices. Computing device 104 may be implemented, as a non-limiting example, using a "shared nothing" architecture.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 may perform determinations, classification, and/or analysis steps, methods, processes, or the like as described in this disclosure using machine-learning processes. A "machine-learning process," as used in this disclosure, is a process that automatedly uses a body of data known as "training data" and/or a "training set" (described further below in this disclosure) to generate an algorithm that will be performed by a Processor module to produce outputs given data provided as inputs; this is in contrast to a non-machine learning software program where the commands to be executed are determined in advance by a user and written in a programming language. A machine-learning process may utilize supervised, unsupervised, lazy-learning processes and/or neural networks, described further below.

With continued reference to FIG. 1, apparatus 100 includes a memory 112 communicatively connected to processor 108. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, using a bus or other facility for intercommunication between elements of a computing device 104. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Still referring to FIG. 1, apparatus 100 may include a remote database 116. In one or more embodiments, remote database 116 may include a database communicatively connected to computing device. Remote database 116 may be implemented, without limitation, as a relational database, a key-value retrieval database such as a NOSQL database, or any other format or structure for use as database that a person skilled in the art would recognize as suitable upon review of the entirety of this disclosure. Database may alternatively or additionally be implemented using a distributed data storage protocol and/or data structure, such as a distributed hash table or the like. Remote database 116 may include a plurality of data entries and/or records as described above. Data entries in database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in database may store, retrieve, organize, and/or reflect data and/or records.

With continued reference to FIG. 1, processor 108 is configured to receive freight data 120 associated with a transport request 128. "Freight data" for the purposes of this disclosure is information associated with one or more items that are sought to be transported from one location to another. For example, and without limitations, freight data 120 may include information about the item such as the height of the items, the weight of the item and the like. In one or more embodiments, freight data 120 includes information relating to freight and the transportation of freight. For example, and without limitation, freight data 120 may include freight dimensions, weight, size, inspection data, shipping destination, shipping origin, material properties of the goods within a freight and the like. a "freight" for the purposes of this disclosure is a good or a list of goods that are to be transported. For example, a freight may include an apple or a case of apples. Freight data 120 may also include safety information relating to the freight being transported, warnings, procedures for proper handling, transport history, and the like. Freight data 120 may further include costs associated with the freight, information relating to the owner of the freight, information relating to the carrier of the freight, contract negotiations relating to the freight and the like. In one or more embodiments, freight data 120 may include the quantity of goods that will be transported, the care requirements (e.g. refrigeration needed, fragile product, etc.) and the like. In one or more embodiments, freight data 120 may include an origin location and a final destination of the freight. In one or more embodiments, freight data 120 may include the time and location in which the freight was received. In one or more embodiments, freight data 120 may include financial information that may be used to charge the individual seeking to transport the freight. In one or more embodiments, freight data 120 may include details such as a quantity of shipments included in the delivery, departure location, destination location, good characteristics (e.g., parts and/or items to be included in each shipment and associated quantity and size of each part included), equipment needed for the transport, and the like. In one or more embodiments, freight data 120 may include physical attribute data 124. "Physical attribute data" for the purposes of this disclosure is information associated with the physical characteristics of the freight. In one or more embodiments, physical attribute data 124 may include the length, width, and height of the freight. In one or more embodiments, physical attribute data 124 may further include the weight of the freight. In one or more embodiments, wherein a freight may be separated and/or broken up into smaller freights, physical attribute data 124 may include weights, dimensions and the like associated with the smaller freights.

With continued reference to FIG. 1, "transport request" for the purposes of this disclosure is communication associated with an item or product that is sought to be shipped. For example, transport request 128 may include communication associated with package that is sought to be shipped to a destination. "Transport" for the purposes of this disclosure refers to the process of shipping an item, product, and the like from one destination to another. In a non-limiting example, a product may be transported from a first city to a second city. In one or more embodiments, transport request 128 may include a communication from an operator or a driver requesting data associated with the weight or dimensions of cargo or freight that is being transported. In one or more embodiments, transport request 128 may include a communication between an individual seeking to transport an item and a company or entity that is capable of transporting the item. "Entity" for the purposes of this disclosure, is an organization comprised of one or more persons with a specific purpose. An entity may include a corporation, organization, business, group one or more persons, and the like. In one or more embodiments, entity may include a business or corporation that is involved in the transportation of goods. In one or more embodiments, a transport request 128 may include a communication from a vendor detailing that there is a shipment ready for delivery and that the vendor needs to schedule a delivery time at a supplier facility. In various embodiments, transport request 128 may be a text, email, generated form, answered prompt, voice recording, video instruction, and the like. Transport request 128 may include textual, audio, or visual data and/or information. In one or more embodiments, transport request 128 may include freight data 120 related to a good (e.g., product), a destination, a time, and the like. In one or more embodiments, a transport may include the process of moving a freight (e.g. wood) from one location to another using a transport carrier 132. A "transport carrier" as used in this disclosure is a machine capable of moving one or more objects between one or more locations. In some embodiments, a transport carrier 132 may include, but is not limited to, a freight carrier, a truck, a car, a boat, a plane, a motorcycle, and the like. A transport carrier 132 may be configured to operate through, but is not limited to, air, land, sea, and the like. A transport carrier 132 may be configured to engage in one or more steps of a transport. In some embodiments, a transport carrier 132 may engage in pickup, delivery, and/or line haul operations. In some embodiments, a transport carrier 132 may include, but is not limited to, Less than Truckload ("LTL") and/or Full Truckload ("FTL") freight delivery. In various embodiments, a transport carrier 132 may be controlled and/or operated by an operator. An "operator," for the purposes of this disclosure, is a person that uses a transport carrier 132. The transport carrier 132 may be used to transport objects from one location to another. Objects may include, as non-limiting examples, cargo, goods, produces, livestock, non-fungible goods, fungible goods, produce, cargo containers, oil, liquids, gasoline, food, meals, people, and the like.

In one or more embodiments, freight data 120 may be received from a user. "User" for the purposes of this disclosure is an individual seeking to transport a freight or package as indicated by freight data 120. In one or more embodiments, freight data 120 may be received through a user interface, such as any user interface as described in this disclosure. In one or more embodiments, the user interface may be populated with input boxes wherein a user may be tasked with inputting data into one or more input boxes wherein the data, may be received as freight data 120. In one or more embodiments, the user interface may include prompts such as "Please enter the weight of the freight that is to be shipped." Wherein an input by the user may be received as freight data 120. In various embodiments, freight data 120 may be input into computing device 104 by a user using, such as, for example, a peripheral input device (e.g., keyboard) or an integrated input component (e.g., touch-screen of computing device 104). For example, and without limitation, a user may input freight data 120 into computing device 104 via graphical user interface or web application using a keyboard. In other embodiments, freight data 120 may be provided from historical data, such as data collected by sensors or past recorded data related to similar freight. For example, and without limitation, one or more sensors communicatively connected to computing device 104 may detect the dimensions of a freight and send the dimensions to computing device 104 for storage in database 116. In other embodiments, freight data 120 may be retrieved from a remote database 116, such as, for example, a website, academic database 116, government database 116, or the like. In an embodiment, freight data 120 may be generated using a sensor. For example, freight data 120 may be generated by scanning the transport being shipped, such as scans of RFID tags at each step of the shipping schedule.

With continued reference to FIG. 1, in one or more embodiments, freight data 120 may be received through a remote device 136. "Remote device" for the purposes of this disclosure is a computing system that is that is separate and distinct from computing device 104. In one or more embodiments, remote device may be communicatively connected to computing device 104. Remote device 136 may include but is not limited to, a laptop, a smartphone, a desktop computer, a smart tablet and the like. In one or more embodiments, computing device 104 may receive freight data from a transmission submitted by remote device.

With continued reference to FIG. 1, processor 108 may be configured to retrieve a plurality of transport carriers 132. In one or more embodiments, the plurality of transport carriers 132 may be retrieved from a database 116. In one or more embodiments, the plurality of transport carriers 132 are associated with transport carriers 132 that are currently being operated by an entity to transport one or more goods. In an embodiment, an entity may continuously update database 116 to provide transport carriers 132 that are currently in use. In one or embodiments, each transport carrier 132 may be associated with a transport categorization. "Transport categorization" for the purposes of this disclosure is a grouping of transport carriers that are associated with a particular type of goods or a particular mode of transport. For example, a transport categorization may include refrigeration wherein the transport carrier 132 is configured to transport goods that require refrigeration. Goods that require refrigeration include, but are not limited to, perishable goods, medications, and the like. In one or more embodiments, transport categorizations may include modes of transport such as through water (e.g. boats), through air (e.g. a cargo aircraft), on the ground (e.g. a truck or a train) and the like. In one or more embodiments, transport categorizations may include groupings based on the size of the shipments. For example, a large freight may require a freight truck, a box truck, or nay method of transport that can contain a larger freight, whereas a smaller freight may only require a cargo van or any other method of transport that is capable of transporting a smaller freight. In an embodiment, transport categorization may include distances wherein transport carriers 132 may be categorized based on their general distance and/or maximum distance. For example, a cargo van may not be configured to travel between cities or states, whereas a semi-truck may be configured to travel larger distances. in one or more embodiments, each transport carrier 132 may be categorized to one or more transport categorizations. In an embodiment, an entity associated with the transport carriers 132 may assign transport categorizations to one or more transport carriers 132 wherein assignment indicates that the transport carrier 132 is configured for transportation of a particular type of goods, transportation over particular distances and the like. In one or more embodiments, each transport carrier 132 may be assigned to one or more transport categorizations wherein each assignment may indicate the transport carriers 132 transporting capabilities. For example, a semi-truck may be assigned to large freights and smaller freights, wherein the semi is capable of transporting both small and large freights. However, a cargo van may only be assigned to smaller freights, wherein the cargo van can only transport smaller freights. In one or more embodiments, transport categorizations may be used to determine which transport carrier 132 may be suitable for transportation of a package. In one or more embodiments, transport categorizations may include categorizations such as short haul, medium, haul, long haul, over-seas, large freight, small freight, medium freight, refrigerated freight, fragile freight and the like. In one or more embodiments, transport categorizations may be used to determine which transport carrier 132 is suitable for a package and which transport carrier 132 is further suited for the package based on the origin and destination. In one or more embodiments, transport categorizations may include groupings of transport carriers 132 based on the type of fuel used. This may include but is not limited to, Gasoline based fuel vehicles, hybrid vehicles, plug in electric vehicles, coal-based transports, heavy fuel oil (HFO) transports, jet fuel-based transport, diesel based transports, plug in hybrid vehicles, and the like.

With continued reference to FIG. 1., in one or more embodiments, processor 108 is configured to determine one or more transport configurations 140 as a function of the freight data 120. "Transport configuration" for the purposes of this disclosure is information associated with the transportation of the freight within freight data 120. For example, and without limitation, transport configuration 140 may include the transport carrier 132 that will be used to transport the freight. In one or more embodiments, transport configuration 140 may include the transport carrier 132 that will be used to transport the freight, the shipping origin of the freight, the shipping destination of the freight, the costs associated with the transportation of the freight, and the like. In one or more embodiments, multiple methods of transport may be used to transport freight wherein each transport configuration 140 may contain one of the multiple methods of transport and/or one or more differing transport carriers 132. For example, and without limitation a first transport configuration may contain information associated with transportation of a freight using a cargo aircraft, whereas a second transport configuration may contain information associated with a method of transport using a truck. In one or more embodiments, each transport configuration 140 may include a temporal element 144. Temporal element 144 for the purposes of this disclosure is information associated with the time necessary to complete the shipment from an origin to a final destination. For example, temporal element 144 may include information indicating that a freight will take four days to be transported from its original location to its final destination. In one or more embodiments, transport configuration 140 may include more than one temporal element 144 wherein each temporal element 144 is associated with a portion of the overall shipment time. For example, a first temporal element 144 may include information indicating a time between the origin and a first stop whereas a second temporal element 144 may include information indicating a time between the first stop and the final destination. In one or more embodiments, multiple temporal elements 144 may be aggregated in order to determine an overall shipping time for the freight from an origin to a final destination. In one or more embodiments, temporal element 144 may be used to communicate with a user, the estimated arrival time of their package or freight. In one or more embodiments, each transport configuration 140 may contain a differing temporal element 144 wherein each transport configuration 140 may contain differing times required to deliver freight. For example, a mode of transport using an aircraft may be quicker to deliver freight in comparison to a truck.

With continued reference to FIG. 1, processor 108 may determine one or more transport configurations 140 as a function of one or more transport thresholds 148. A "transport threshold" for the purposes of this disclosure is one or more limits or ranges that may be used to determine whether freight is suitable for a transport carrier 132. For example, a transport threshold 148 may include a weight limit wherein exceeding the weight limit may indicate that a transport carrier 132 cannot accommodate a particular freight. In one or more embodiments, transport thresholds 148 may be used to determine one or more transport carriers 132 that are capable of transporting a freight associated with freight data 120. In one or more embodiments, each transport carrier 132 may be associated with one or more transport thresholds 148 wherein exceeding the threshold may indicate that a particular transport carrier 132 is not suitable for transport. In one or more embodiments, transport thresholds 148 may include but are not limited to, thresholds associated with range, thresholds associated with weight, thresholds associated with weight and/or any other thresholds associated with any transport categorizations as described above. In an embodiment, freight data 120 may be compared to one or more transport thresholds 148 wherein exceeding one or more thresholds may indicate that one or more transport carriers 132 are not a fit. For example, exceeding a weight limit threshold may indicate that a cargo can is not suitable for transportation of freight. In one or more embodiments, a failure to exceed one or more thresholds may indicate that freight is capable of being transported on one or more transport carriers 132. For example, a comparison of weight within freight data 120 and one or more transport thresholds 148, wherein the weight does not exceed the threshold may indicate that the freight may be placed on one or more transport carriers 132. In one or more embodiments, each transport categorization may include one or more transport thresholds 148. For example, a transport categorization such as 'short haul' may include a maximum traveling distance, wherein a large traveling distance as indicated by an origin and destination within freight data 120 may indicate that a transport carrier 132 associated with short haul will not be a good match. In one or more embodiments, determining a transport configuration 140 may include comparing physical attribute data 124 to one or more transport thresholds 148. In an embodiment, one or more elements of physical attribute data 124 may be compared to one or more transport thresholds 148 wherein the exceeding and/or failing to meet a threshold may indicate a particular transport carrier 132 to be used within vehicle configuration. For example, physical attributes data may include a height of a freight wherein the height may be compared to transport threshold 148 to determine which transport carrier 132 is capable of transporting freight.

With continued reference to FIG. 1, in one or more embodiments, a particular good or freight may be transported on one or more methods and/or modes of transport or transport carriers 132. For example, freight may be transported by cargo aircraft, a ship, a truck and the like. In one or more embodiments, processor 108 may determine multiple transport configurations 140 wherein the transport configurations 140 indicate differing methods of transport or differing transport carriers 132. In one or more embodiments, each transport configuration 140 may contain differing methods of transport which a user may select from. For example, a user may select a transport configuration 140 in which freight is delivered by a cargo aircraft or the user may select a transport configuration in which freight is delivered on a cargo ship. In one or more embodiments, each transport configuration 140 may be associated with one or more transport thresholds 148 wherein processor 108 may determine transport configurations 140 based on whether freight data exceeded the transport thresholds 148 associated with the transport configuration 140. For example, processor 108 may determine that a transport configuration 140 may include delivery of a freight using a cargo aircraft wherein the freight does not exceed any weight limits or size limits that may prevent the freight from being transported by the cargo aircraft. Continuing, processor 108 may determine multiple transport configurations 140 wherein each transport configuration 140 may contain a different mode of transport.

In one or more embodiments, processor 108 may generate one or more projected transport journeys 152. In one or more embodiments, each transport configuration 140 of the one or more transport configurations 140 may include projected transport journey 152. "Projected transport journey" for the purposes of this disclosure refers to information associated with calculated routes that will be used to transport a freight from an original location to a destination. For example, projected transport journey 152 may include information indicating that the freight will travel from an origin to a first stop, a first stop to a second stop, and a second stop to a final destination. In one or more embodiments, projected transport journey 152 may include an estimated plan of travel associated with the freight and freight data 120. In one or more embodiments, projected transport journey 152 may include a designated route from origin to destination. In one or more embodiments, projected transport journey 152 may include designated streets, highways, freeways, tollways that the transport carrier 132 will be travelling on. In one or more embodiments, projected transport journey 152 may include the total distance traveled from an origin location (e.g. a pickup or drop off location of freight) and a final destination. In one or more embodiments the total distance may be quantified in miles, nautical miles, knots and/or any other measurements that may be used to express a distance. In one or more embodiments, the distance may be quantified in a combination of one or more measurements. For example, a freight may first travel on an aircraft wherein the distance is quantified in nautical miles, wherein the freight may then travel on ground wherein the distance is quantified in miles. In one or more embodiments, projected transport journey 152 may include one or more transport routes 156. "Transport route" for the purposes of this disclosure is a segment of an overall route that is traversed by one transport carrier 132. For example, a projected transport journey 152 may contain multiple transport routes 156 wherein a first transport route 156 may transport a freight from an origin location to a first stop, a second transport route 156 may transport the freight from the second stop to a third stop, and the third transport route 156 may transport the freight from the third stop to a final destination. Continuing, the first transport route 156 may utilize a transport carrier 132 such as a cargo van to transport the freight to a distribution center, wherein a semi-truck may be utilized for the second transport route 156 to transport the freight from the distribution center to another distribution center in another city or state, and finally a third transport carrier 132 such as a cargo van by transport the freight from a second distribution center to its final destination which may be within the vicinity. In one or more embodiments, multiple differing transport carriers 132 may be required to transport freight from an origin to a destination. In one or more embodiments, each transport route 156 may include a route traversed by a particular transport carrier 132. In one or more embodiment, projected transport journey 152 may include multiple transport route 156 wherein each transport route 156 may include a singular street, a set of streets within a given geographical location, a highway or set of highways (wherein any distance traveled on a particular highway may be included in a single transport route 156), a freeway, a city, a stretch of land traversed, a stretch of water traversed, a stretch of air traversed and the like. In one or more embodiments, projected transport journey 152 may include multiple transport routes 156 wherein each transport route 156 may be separated by a given geographic location, a given elevation, a given incline on a stretch of road, a given decline on a stretch of road, a given population density of an area, and the like. In one or more embodiments, transport routes 156 may be separated based on road work wherein the presence of road work may indicate that that projected transport journey 152 may be increased or decreased as a result of the road work. In one or more embodiments, transport routes 156 may include any segment of a projected transport journey 152 that affect the arrival time of a delivery as well as the carbon emissions that would affect the delivery. For example, a transport carrier 132 sitting idle in traffic due to construction may affect the overall carbon emissions that are emitted as a result of the construction. Similarly, a stretch of road with a given incline may affect carbon emissions in contrast to a stretch of road having a decline. In one or more embodiments, multiple projected transport journeys 152 may be generated wherein each projected transport journey 152 may include a differing transport route 156, a differing set of transport routes 156, a differing transport carrier 132 used, a differing set of transport carriers 132 and the like.

With continued reference to FIG. 1, processor 108 may determine transport configuration 140 and/or projected transport journey 152 based on the origin location of freight and the final destination of freight. In one or more embodiments, an entity may have and/or be associated with multiple distribution centers. "A distribution center" for the purposes of this disclosure is a facility that is designed to receive goods that are to be transported. In one or more embodiments, distribution centers are used to determine which transport carrier 132 a good should be placed on. In one or more embodiments, distribution centers receive goods and determine the transport carriers 132 that the goods should be placed on in order to deliver the goods to their final location. In one or more embodiments, database 116 may be populated with a plurality of distribution centers located in various cities, states and/or countries wherein transport carriers 132 are configured to transport goods to and from the distribution centers. In one or more embodiments, one or more transport carriers 132 are configured to receive goods within a geographic location of a distribution center, wherein the goods are delivered to the distribution center. In one or more embodiments, goods are then transported to a distribution center that is within a particular geographic location of the destination. Finally, a transport carrier 132 may be configured to receive the goods from the distribution center and deliver the goods to the final destination. In one or more embodiments, transport carriers 132 configured to pick up goods from an origin location and transport them to a distribution center may be smaller transport carriers 132 such as cargo vans, box trucks and the like. In one or more embodiments, transport carriers 132 that are configured to pick up goods from an origin location to a distribution center and/or from a distribution center to a final destination may be referred to as "local delivery trucks". Local delivery trucks may be smaller in size and may be configured for travel within a state. In one or more embodiments, transport carriers 132 that transport cargo and/or freight from one distribution center to another may be referred to as "intercity" and/or "long haul trucks". Long haul trucks may be larger and may be configured to transport more cargo. In one or more embodiments, processor 108 may determine projected transport journey 152 by determining a route from an origin location to a final destination using one or more local delivery trucks and intercity trucks. In one or more embodiments, processor 108 may determine the routes of one or more transport carriers 132 to determine an overall projected transport journey 152. In one or more embodiments, processor 108 may utilize various mapping software, such as software that may be used to determine efficient routes for transport carriers 132 in order to determine projected transport journey 152.

With continued reference to FIG. 1, processor 108 may determine multiple projected transport journeys 152 wherein each transport journey 152 denotes a particular transport route 156, set of transport routes 156, a particular transport carrier 132, a particular set of transport carriers 132 and the like. In one or more embodiments, multiple differing transport routes 156 may be used to transport a freight from an origin location to a final location. In one or more embodiments, each projected transport journey 152 and/or transport configuration 140 may denote a particular transport route 156 or transport carrier 132 that may be used to transport freight from one location to another. In one or more embodiments, processor 108 may determine one or more projected transport journeys 152 from an origin location to a final destination. For example, multiple transport carriers 132 may depart from a distribution center wherein each transport carrier 132 may be used to transport the freight associated with freight data to a final destination. For example, a cargo aircraft and a truck may depart from distribution center wherein the cargo aircraft or the truck may be used to transport freight to a final destination or another distribution center. In one or more embodiments, a cargo aircraft may be used to transport freight wherein the freight may be transported sooner in comparison to other transport carriers 132. However, costs and/or emissions associated with the cargo aircraft may be increased. In one or more embodiments, each projected transport journey may contain transport routes and associated transport carriers wherein each transport route between the projected transport journeys 152 may differ. For example, an aircraft may have a differing route than a truck. In one or more embodiments, each projected transport journey 152 may contain similar transport routes and transport carriers which traverse those transport routes. For example, and without limitation, a transport of a freight from an origin location, such as an office or a home, may utilize a cargo van or a box truck to transport the freight to a distribution center. In one or more embodiments, variations of transport routes 156 and/or transport carriers 132 may exist at distribution centers wherein users may select the particular projected transport journey 152 and/or transport configuration 140.

With continued reference to FIG. 1, in one or more embodiments, each transport configuration 140 may contain a temporal element 144 as described above. In one or more embodiments, temporal element 144 may be determined based on prescheduled pick up and drop off times for one or more transport carriers 132. For example, a transport carrier 132 may be scheduled to pick up packages every day at 3:00 pm and drop them off at a distribution center at roughly 4:00 pm. In addition a transport carrier 132 traveling from a first distribution center may be scheduled to depart at 6:00 pm on a first day and arrive at 11:00 am on a second day. In one or more embodiments, each transport route 156 may include a projected transport time, wherein the projected transport time is an estimation of the time it may take to traverse transport route 156. In one or more embodiments, processor 108 may aggregate the projected transport times for the transport routes 156 to generate temporal element 144. In one or more embodiments, temporal element 144 may be generated based on historical data wherein historical data includes previous transport carriers 132 that traversed similar routes. In one or more embodiments, each transport route 156 may contain a predetermined time wherein the predetermined time is calculated from previous transports. In one or more embodiments, each transport route 156 may include an overestimation of the time it may take to traverse a transport route 156 in order to compensate for various delays that may occur. In one or more embodiments, temporal element 144 may be determined based on the time of day in which the freight was received. For example, and without limitation, a freight received late in the afternoon may be transported quicker overnight (as opposed to during the day) wherein less traffic may allow for quicker transport times. In one or more embodiments, database 116 may be populated with a plurality of distribution centers wherein each distribution center may contain schedules for each transport carrier 132. In one or more embodiments, processor 108 may determine temporal element 144 as a function of the schedules. In one or more embodiments, database 116 may include schedules for one or more transport carriers 132 wherein each transport carrier 132 may differ based on its transportation categorization. In one or more embodiments, temporal element 144 for each transport configuration may be based on the transport carriers 132 within each transport configuration 140, wherein each transport carrier 132 within each transport configuration 140 may contain differing departure times, differing arrival times and/or projected transport times. In one or more embodiments, processor 108 may determine one or more projected transport journeys 152 and generate a temporal element 144 for each projected transport journey 152. In one or more embodiments, processor 108 may receive scheduled departure and arrival times for one or more transport carriers 132 from a database 116 wherein processor 108 may determine temporal element 144 based on scheduled departure and arrival times. In one or more embodiments, two projected transport journeys 152 and/or transport configurations 140 may contain the same or similar transport routes but the temporal elements 144 of each transport configuration 140 may differ. For example, freight may be picked up on a later day or at a later time based on scheduled pick up and drop off times at the pickup location of freight. In another non-limiting example, and without limitation, a first transport carrier may contain a gas powered vehicle whereas a second transport carrier may contain a battery powered vehicle, wherein both vehicles are configured to traverse the same routes. Continuing, the gas-powered vehicle may be scheduled to depart an origin location prior to the battery powered vehicle. In one or more embodiments, the battery powered vehicle may be favored over the gas-powered vehicle due to possibility of decreased carbon emissions associated with the transport of a freight. As a result, a user may select a transport configuration 140 with a later delivery time in order to ensure that the freight is delivered with an electric vehicle. As a result, more than one transport configurations 140 May be determined wherein each transport configuration 140 may contain a differing transport carrier 132, a differing temporal element 144 and the like. In one or more embodiments, the one or more transport configurations 140 may contain a first transport configuration 140 and a second transport configuration 140 wherein the first transport configuration 140 contains a differing temporal element as a the second transport configuration 140.

With continued reference to FIG. 1, in one or more embodiments, processor 108 may select one or more transport carriers 132 that are capable to deliver freight. In one or more embodiments, processor 108 may select a transport carrier 132 based on the transport thresholds 148 as described above. In one or more embodiments, processor 108 may further select the transport carrier 132 that is currently available and/or that currently contains sufficient space to transport freight. In one or more embodiments, each distribution center may contain a list of transport carriers 132 traveling to a similar location wherein a first transport carrier 132 in the list may be filled prior to a second transport carrier 132 being filled. In one or more embodiments, processor 108 may select transport carrier 132 based on the availability of space within transport carrier 132. For example, a first transport carrier 132 may be partially filled wherein a freight associated with freight data 120 may not fit within the transport carrier 132. As a result, processor 108 may be configured to select a following vehicle to transport freight. In one or more embodiments, processor 108 may be communicatively connected to one or more freight logistics software wherein processor 108 may input freight data 120 and receive transport configuration 140. In one or more embodiments, processor 108 may be configured to retrieve the list of transport carriers from each distribution center from remote database 116 or a set of remote databases. In one or more embodiments, each distribution center may upload to transmit a list of transport carriers to remote database wherein processor 108 may be configured to retrieve the list of vehicles. In one or more embodiments, each distribution center may continuously and/or systematically update remote database 116 to reflect the current list of available transport carriers 132. In one or more embodiments, each distribution center may contain its own software, programming and/or apparatus for transportation of freights. In one or more embodiments, apparatus may use an application program interface (API) in order to communicate with software and/or systems of one or more distribution centers. In one or more embodiments, apparatus 100 may use API to retrieve available transport carriers 132, routes of the transport carriers 132 and/or goods within the transport carriers 132.

With continued reference to FIG. 1, one or more transport carriers 132 may be associated with one or more transport routes 156. In one or more embodiments, each transport route 156 may include multiple transport carriers 132 that are configured to service the transport route 156. For example, multiple transport carriers 132 may be configured to transport goods from one distribution to another. Similarly, multiple transport carriers 132 may be used for local pickup and delivery wherein multiple transport carriers 132 may be used to pick up goods and transport them to a single distribution center and/or pick up goods from a single distribution center to one or more destinations. In one or more embodiments, each transport carrier 132 may be assigned to a particular transport route 156. In one or more embodiments, processor 108 may determine one or more transport routes 156 wherein each transport route 156 may be associated with one or more transport carriers 132. In one or more embodiments, transport carriers 132 servicing the same transport route 156 may differ in size, fuel consumption, carbon emission and the like. In one or more embodiments, projected transport journey 152 may be generated as a function of one or more transport routes 156 wherein projected transport journey 152 may contain an aggregation of multiple transport routes 156. In one or more embodiments, selection of a transport carrier 132 to transport freight along a transport route 156 may be determined based on availability of transport carriers 132 at any given moment.

With continued reference to FIG. 1, processor 108 may determine one or more projected transport journeys 152 using one or more mapping software as described above. In one or more embodiments, elements of transport configuration 140 may be generated as a function of projected transport journey 152 wherein temporal element 144 may be determined based on the total distance that will be travelled as indicated by projected transport journey 152. In one or more embodiments, transport configuration 140 may include one or more transport carriers 132 and the transport routes 156 that will be traversed by the transport carriers 132 based on projected transport journey 152. In one or more embodiments, processor 108 may determine a route for freight wherein processor 108 may be configured to determine transport carriers 132 to transport freight along various transport routes 156. In one or more embodiments, processor 108 may input freight data 120, projected transport journey 152 and any other data into one or more line haul logistics software to determine one or more transport carriers 132 within transport categorization, one or more transport routes 156 and the like.

With continued reference to FIG. 1, in one or more embodiments, processor 108 may be configured to generate a projected carbon emission 160 for each determined transport configuration 140 as a function of the freight data 120 and a carbon projection module 164. In one or more embodiments, projected carbon emission 160 may be generated as a function of freight data 120, carbon projection module and/or transport configuration 140. "Projected carbon emission" for the purposes of this disclosure is information relating to an estimation or calculation of the amount of carbon that will be emitted as a result of the freight being transported from one location to another. For example, projected carbon emission 160 may include information estimating that delivery or transport of a freight may cause 7.5 kilograms of carbon to be emitted. In one or more embodiments, projected carbon emission 160 may include a range of estimations. For example, projected carbon emissions 160 may include an estimation such as 6.5-7.2 kilograms of carbon emitted. In one or more embodiments, projected carbon emission 160 may include an estimation of carbon emitted as well as a standard deviation indicating how accurate the results may be. In an embodiment, the standard deviation may allow a user to understand what the expected carbon to be emitted will be and the amount of variation that may exist between projected carbon emissions 160 and actual carbon emissions. In one or more embodiments, projected carbon emissions 160 may include an aggregation of carbon emissions of one or more transport carriers 132 that are used to transport freight. In one or more embodiments, projected carbon emissions 160 may include pollutants and/or an aggregation of calculated pollutants that will be emitted as a function of the transportation of the freight. In one or more embodiments, projected carbon emission 160 may include one or more pollutants that will be emitted as a function of the transport such as, but not limited to m carbon dioxide, particular matter, nitrous oxides, sulfur, hydrocarbons, carbon monoxide and the like. In one or more embodiments, projected carbon emission 160 may include emissions for each transport route 156, for each vehicle and the like.

In one or more embodiments, projected carbon emission 160 may be generated for each transport configuration 140 as a function of freight data 120 and a carbon projection module 164. "Carbon projection module" for the purposes of this disclosure is one or more algorithms or calculations that may be used to estimate carbon emissions for freight. In one or more embodiments, inputs such as freight data 120 and/or transport configuration 140 may be fed into carbon projection module 164 wherein outputs such as projected carbon emission 160 may be output from carbon projection module 164.

In one or more embodiments, carbon projection module 164 may determine projected carbon emission 160 based on actual carbon emitted on previous routes. For example, carbon projection module 164 may determine the total carbon emission emitted on a previously traversed transport route 156 based on fuel consumption, fuel usage and the like carbon projection module 164 may determine an average carbon emission for each route. In one or more embodiments, carbon projection module 164 may receive previous route data. "Previous route data" for the purposes of this disclosure is information relating to a previously traversed transport route 156 or a previously traversed projected transport journey 152 and the corresponding fuel usage for the transport route 156 or projected transport journey 152. In one or more embodiments, previous route data may be retrieved from a database 116. In one or more embodiments, previous route data may be input by an operator and/or an agent of entity wherein the agent is tasked with inputting previously traversed routes and the corresponding fuel usage for those routes. In one or more embodiments, previous route data may include actual carbon data (described in further detail below). In one or more embodiments, previous route data may contain actual carbon data (as described in further detail below) received from previous iterations. In one or more embodiments, carbon projection module 164 may receive a plurality of previous route data and make one or more determinations, calculations and/or estimations. In one or more embodiments, carbon projection module 164 may calculate the average carbon emitted over an entire projected transport journey 152 and generate projected carbon emission 160 as a result. In one or more embodiments, carbon projection module 164 may receive previous route data wherein previous route data includes carbon emissions over each transport route 156. In one or more embodiments, carbon projection module 164 may generate an average carbon emission from each transport route 156 wherein projected carbon emission 160 may include an aggregation of one or more transport routes 156. In one or more embodiments, projected carbon emission 160 for each transport configuration 140 and/or projected transport journey 152 may differ. For example, and without limitation, a transport configuration that delivers freight using a cargo aircraft may contain more projected carbon emissions in comparison to an electric vehicle. In one or more embodiments, each transport configuration 140 may be associated unique set of projected carbon emissions 160. In one or more embodiments, projected carbon emission 160 of a first transport configuration 140 may differ from projected carbon emission 160 of a second transport configuration 140.

With continued reference to FIG. 1, carbon projection module 164 may determine a projected carbon block 168 for each transport route 156 of a plurality of transport routes 156 within each transport configuration 140. "Projected carbon block" for the purposes of this disclosure is an estimation or calculation of carbon that will be emitted for each transport route 156. In one or more embodiments, one or more projected carbon blocks 168 may be aggregated to generate projected carbon emission 160. In one or more embodiments, processor 108 may be configured to receive a plurality of transport routes 156 from database 116, wherein each transport route 156 is associated with one projected carbon block 168. In one or more embodiments, database 116 may be populated with a plurality of projected carbon blocks 168 associated to a plurality of transport routes 156, wherein each transport route 156 includes projected carbon block 168. In one or more embodiments, carbon projection module 164 may receive projected transport journey 152 and correlated transport routes 156. In one or more embodiments, carbon projection module 164 may then generate carbon emission projection as a function of one or more projected carbon blocks 168, wherein each projected carbon block 168 is associated with each transport route 156. In one or more embodiments, processor 108 may be configured to determine projected carbon block 168 by receiving carbon emission of a previous route, segmenting the route into one or more transport routes 156 and determining a projected carbon block 168 for each transport route 156. For example, a particular route of 100 miles may emit 100 kilograms (kg) of carbon, wherein the route may consist of 2 transport routes 156, each 50 miles long. Processor 108 may determine that each transport route 156 is responsible for 50 kg of carbon emitted. In one or more embodiments, processor 108 may receive a total fuel usage between two points and determine projected carbon block 168 for a transport route 156 contained within the two points. In one or more embodiments, one or more transport carriers 132 may be associated with one or more transport routes 156. In one or more embodiments, processor 108 may determine a carbon emission of each transport carrier 132 within a transport route 156 and generate an average amongst the transport carriers 132 wherein the average may be used to generate a projected carbon block 168. In one or more embodiments, it may be difficult to ascertain exactly which transport carrier 132 will be used to transport a package in advance. In one or more embodiments, it may seem unfair to generate fuel efficiency based on a particular transport carrier 132 as users do not have the choice to choose more fuel-efficient vehicles. For example, a battery-operated transport carrier 132 may emit far less carbon than a diesel vehicle on the same transport route 156. In an embodiment, projected carbon block 168 may be generated as an average of one or more transport carriers 132 that are currently operating on a singular transport route 156. For example, and without limitation, projected carbon block 168 may include a calculated average 10 transport carriers 132 associated with a particular transport route 156, wherein three vehicles are battery operated. Continuing the example, while the three battery operated transport carriers 132 may emit far less emission, each vehicle may contain the same average carbon emitted. In an embodiment, a simple average such as the calculation described above may allow for quicker processing. Additionally or alternatively, transport configuration 140 may contain one or more transport routes 156 as well as the particular transport carriers 132 that will be used. In one or more embodiments, projected carbon block 168 may be generated as a function of the particular transport carrier 132 used wherein an electric transport carrier 132 may emit far less emissions than a gas generated vehicle. In one or more embodiments, projected carbon block 168 may be generated based on average fuel efficiency generated for each vehicle based on average fuel efficiencies calculated on previous dates. In one or more embodiments, projected carbon block 168 may further be generated based on average fuel consumption wherein a particular fuel consumption indicates a particular carbon emission. In one or more embodiments, where transport carriers 132 are battery operated, processor 108 may determine carbon emissions based on the source of the electricity. For example, electricity received from a solar panel may contain far less carbon emissions than a electricity received from a gas power plant. In one or more embodiments, processor 108 may receive charge location of one or more transport carriers 132 wherein the charge location may indicate the particular source of the electricity as well as the carbon emitted per KWH. In one or more embodiments, projected carbon block 168 may be generated as a function of one or more transport categorization. In an embodiment, each transport categorization may be associated with a particular calculation and/or projected carbon block 168. For example, a transport carrier 132 may be associated to a transport categorization such as diesel, wherein projected carbon block 168 may be generated with respect to diesel vehicles.

With continued reference to FIG. 1, processor 108 may utilize a Web Crawler to retrieve one or more variables that may be used to generate projected carbon emission 160. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, computing device 104 may generate a web crawler to retrieve variables that may be used to generate one or more calculations with respect to projected carbon data. In one or more embodiments, processor 108 may continuously update variables within carbon projection module 164 to produce more accurate results. The web crawler may be seeded and/or trained with websites, such as websites describing transport carrier 132 fuel efficiencies, carbon emissions, carbon emitted by power plants and the like to begin the search. A web crawler may be generated by computing device 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract any data suitable for processing.

With continued reference to FIG. 1, carbon projection module 164 may use one or more linear regression models to calculate projected carbon emissions 160 for each transport configuration 140. For instance, and without limitation, a linear regression model, generated using a linear regression algorithm, may compute a linear combination of input data using coefficients derived during machine-learning processes and/or other processes to calculate an output datum. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure. In one or more embodiments, linear regression models may contain independent variables that are used to generated an estimated dependent variable such as projected carbon emission 160. In one or more embodiments, simple linear regression models include simple linear equations such as $y=b+m(x)$ wherein the 'y' denotes the independent variable that is to be estimated, 'm' denotes the slope of the line (sometimes known as the regression coefficient), the x denotes the known variable (called a score on the independent variable) and the b denotes a constant. In multiple linear regression, wherein multiple factors may contribute to an output, equations may take the form of $y=b_0+b_1x_1+b_2x_2 \ldots +b_nx_n$. In one or more embodiments, carbon projection module 164 may utilize an arithmetic logic unit to generate a linear regression equation using given points from previous route data. In one or more embodiments, one or more linear regression equations may be generated by collecting data (e.g. such as previous route data, comparing the data to one or more predetermined linear equations, generating a loss function between the data and the linear equation, adjusting the linear equation in order to minimize the loss function, and generating a linear equation until the loss function is minimized. In one or more embodiments, an initial linear question may be generated by calculating a slope of an average of multiple data points that are associated with a y intercept and an X intercept. For example, previous route data may include data of distance and fuel consumed wherein a slope may be created based on the average of the distance and the fuel consumed. In one or more embodiments, multiple linear regression equations may account for one or more transport factors that may affect projected carbon emissions 160. Transport factors that may affect projected carbon emissions 160 may include, but are not limited to, the transport carrier 132, the individual driving the transport, the weather, tire pressure, the age of the transport, the presence of construction, transport during various hours, the closing of a street lane and the like. In one or more embodiments, carbon projection module 164 may generate multiple linear equations using matrix notation wherein values may be introduced within a matrix format. In one or more embodiments, multiple linear regression equations may include multiple independent variables wherein each independent variable may affect the outcome of projected carbon emission 160. In one or more embodiments, computing device 104 and/or carbon projection module 164 may generate an equation such as, $y=b_0+b_1x_1+b_2x_2 \ldots +b_nx_n$. In one or more embodiments carbon projection module 164 may use ridge regression, lasso regression and any other techniques to generate linear regression equations.

With continued reference to FIG. 1, processor 108 and/or carbon projection module 164 may be configured to generate linear regression equations for each transport route 156. In one or more embodiments, one or more known variables may be input into the linear equation to generate one or more projected carbon blocks 168. In one or more embodiments, linear regression equations may be used to determine projected carbon emission 160 of projected transport journey 152. In one or more embodiments, carbon projection module 164 may utilize a web crawler to retrieve a plurality of traffic data. "Historical traffic data" for the purposes of this disclosure refers to historical road traffic of a particular geographic location. Historical traffic data may include historical data of traffic speeds. For example, traffic data may include the speed of one or more vehicles during various hours. Historical traffic data may further include the speed of traffic during construction occurring on or near the roads. Historical traffic data may further include the speed of cars during various times of the year (e.g. winter, summer, etc.) In one or more embodiments, historical traffic data may be used to indicate the speed of a transport carrier 132 based on various times and occurrences. These variables may then be used to generate variables that can be used to determine projected carbon emission 160.

In one or more embodiments, carbon projection module 164 may be configured to receive a plurality of live map data from one or more data providers. "Live map data" for the purposes of this disclosure is information relating to traffic that is currently occurring or will occur. In one or more embodiments, live map data may include information such as construction occurring on various roads. In one or more embodiments, live map data may further include proposed days of construction, proposed closures, expected traffic delays due to events occurring and the like. In one or more embodiments, live map data may further include any information that may be dispositive of whether traffic may be slowed or sped up in the near future. In one or more embodiments, live map data may be retrieved from one or more data providers. "A data provider" is a person or entity that provides data with respect to traffic updates. In one or more embodiments, data provider may include one or more mapping software corporations. In one or more embodiments, web crawler may be configured to crawl through various governmental websites to retrieve various road closures that may occur along a route. In one or more embodiments, carbon projection module 164 may use transport factors from live map data to make one or more determinations of projected carbon emission 160 as described above.

With continued reference to FIG. 1, carbon projection module 164 may be configured to receive operator data. "Operator data" for the purposes of this disclosure is information associated with the driver of transport carrier 132. In one or more embodiments, each driver may have differing driving capabilities and as a result have differing carbon outcomes due to their driving. For example, a first driver may tend to drive above the speed limit or make quick stops wherein projected carbon emission may be raised due to the first driver's tendency to speed and make short stops. In contrast, a second driver may drive at a steady pace in order to avoid quick stops and burn unnecessary fuel. As a result, the second driver may use less emissions. In one or more embodiments, operator data may include deviations to projected carbon emissions 160 wherein each driver may have differing deviations. For example, a first driver may add 10% to projected carbon emissions whereas a second driver may decrease projected carbon emission by 10%. In one or more embodiments, projected carbon module 164 may determine deviations for each driver and generate operator data. In one or more embodiments, one or more machine learning models and/or linear regression systems may be used to determine how much each driver deviates from the projected carbon emission. In one or more embodiments, operator data may include driving habits of drivers on previous dates and times. For examples, operator data may include speeds associated with the driver on previous deliveries, stops, frequency of stops, emissions associated with the driver and the like. In one or more embodiments, carbon projection module 164 may generate projected carbon emission 160. In one or more embodiments, processor 108 may be configured to retrieve a plurality of previous route data wherein each previous route data may be associated with a driver. In one or more embodiments, carbon projection module and/or processor may be configured to retrieve a list of drivers from remote database 116 wherein each transport carrier 132 may contain a corresponding driver. In one or more embodiments, carbon projection module may determine a driver and determine projected carbon deviation as a function of operator data and/or previous route data.

With continued reference to FIG. 1, carbon projection module 164 may generate a base carbon emission for each transport route 156 based on typical road conditions wherein typical road conditions describe road conditions in which there are no uncommon obstructions (e.g. construction, a car accident, and the like). In one or more embodiments, carbon projection module 164 may then generate a carbon deviation for each obstruction based on previous route data. "Carbon deviation" for the purposes of this disclosure is an increase or decrease in carbon emissions due to one or more transport factors as described above. For example, carbon projection module 164 may indicate that a particular transport route 156 emitted 10% and/or 10 kg more emissions than average due to construction on the road. As a result, carbon projection module 164 may determine that construction on the road may result in a carbon deviation of +10% and/or in an increase of 10 kg. In one or more embodiments, carbon projection module 164 may determine a carbon deviation for each transport factor as described above. In one or more embodiments, carbon projection module 164 may utilize historical traffic data to determine what the increase or decrease in carbon emissions may be attributed to. In one or more embodiments, carbon projection module 164 may generate an average carbon deviation for each transport factor wherein the presence of a transport factor may indicate an increase or decrease in carbon emissions. As a result, carbon projection module 164 may generate projected carbon emission 160 based on the base carbon emission and one or more carbon deviations. In one or more embodiments, carbon deviation may be determined based on live map data wherein the presence of construction, road closures and the like may indicate the addition of one or more carbon deviations.

With continued reference to FIG. 1, projected carbon emission 160 may be calculated based on an overall weight of freight and/or an overall size of freight. In one or more embodiments, projected carbon emission 160 may be associated with the storage capacity of transport carrier 132. For example, a freight that consumes 20% of an overall storage capacity of freight may be responsible for 20% of carbon emissions over an entire route. In one or more embodiments, carbon projection module 164 may aggregate projected carbon blocks 168 and assigned freight a projected carbon emission 160 based on its overall size within transport configuration 140. In one or more embodiments, wherein different transport configurations 140 may be used, differing percentages may be used to determine projected carbon emission 160. For example, freight may consume 20% of the storage capacity of a first transport carrier 132, and 5% of the total capacity of a second transport carrier 132. In one or more embodiments, carbon projection module 164 may be configured to receive a storage capacity of a transport carrier 132 and/or an average storage capacity of multiple transport carriers 132 associated with the same transport routes 156 wherein a volume and/or size of freight as indicated by physical attribute data 124 may be used to determine the corresponding projected carbon emissions 160 of each good or freight within transport carrier 132.

With continued reference to FIG. 1, carbon projection module 164 may receive the weight of a freight and adjust projected carbon emission 160 accordingly. For example, the weight of freight may increase fuel consumption and/or carbon emissions wherein projected carbon emission 160 may be adjusted accordingly. In one or more embodiments, carbon projection module 164 may generate one or more linear regression equations to determine a base carbon emission (e.g. such as when the transport carrier 132 is empty or contains a certain load weight) and a change in carbon emission based on an increase or decrease in weight. In one or more embodiments, projected carbon emission 160 may be generated as a function of the overall weight within the storage of transport, wherein a percentage of projected carbon emission 160 may be assigned to each good in the transport based on its percentage of weight in comparison to an overall weight. For example, freight consuming 20% of the overall weight may be attributed to 20% of the carbon that was emitted. In one or more embodiments, carbon projection module 164 may generate a total estimation of carbon emission for the transport carrier 132 and assign a percentage to each good in the transport based on its weight and/or size.

With continued reference to FIG. 1, in one or more embodiments, carbon projection module 164 may generate projected carbon emissions 160 as a function of a machine learning model. Additionally or alternative, carbon projection module 164 may determine one or more projected carbon blocks 168 as a function of a machine learning model, wherein the aggregation of projected carbon blocks 168 may be used to generate projected carbon emissions 160.

With continued reference to FIG. 1, processor 108 may use a machine learning module, such as a projection machine learning module for the purposes of this disclosure, to implement one or more algorithms or generate one or more machine-learning models, such as a projection machine learning model 172, to generate one or more projected carbon emission 160 and/or projected carbon blocks 168. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from database 116, such as any database 116 described in this disclosure, or be provided by a user. In other embodiments, a machine-learning module may obtain a training set by querying a communicatively connected database 116 that includes past inputs and outputs. Training data may include inputs from various types of databases 116, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more transport categorizations corresponding to categories of data elements. As a non-limiting example, training data may include data entered in standardized forms by persons or processes, such that entry of a given data element in a given field in a form may be mapped to one or more categories. Elements in training data may be linked to categories by tags, tokens, or other data elements. A machine learning module, such as projection machine learning module, may be used to generate projection machine learning model 172 and/or any other machine learning model described herein using training data. projection machine learning model 172 may be trained by correlated inputs and outputs of training data. Training data may be data sets that have already been converted from raw data whether manually, by machine, or any other method. projection training data 176 may be stored in database 116. Projection training data 176 may also be retrieved from database 116. In some cases, projection machine learning model 172 may allow for computing device 104 to compare two data items, to sort efficiently, and/or to improve the accuracy of analytical methods.

With continued reference to FIG. 1, in one or more embodiments, a machine-learning module may be generated using training data. Training data may include inputs and corresponding predetermined outputs so that machine-learning module may use the correlations between the provided exemplary inputs and outputs to develop an algorithm and/or relationship that then allows machine-learning module to determine its own outputs for inputs. Training data may contain correlations that a machine-learning process may use to model relationships between two or more categories of data elements. The exemplary inputs and outputs may come from database 116, such as any database 116 described in this disclosure, or be provided by a user such as a prospective employee, and/or an employer and the like. In other embodiments, projection machine-learning module may obtain a training set by querying a communicatively connected database 116 that includes past inputs and outputs. Training data may include inputs from various types of databases 116, resources, and/or user inputs and outputs correlated to each of those inputs so that a machine-learning module may determine an output. Correlations may indicate causative and/or predictive links between data, which may be modeled as relationships, such as mathematical relationships, by machine-learning processes, as described in further detail below. In one or more embodiments, training data may be formatted and/or organized by categories of data elements by, for example, associating data elements with one or more transport configurations 140 corresponding to categories of data elements. As a non-limiting example, training data may include data entered in standardized forms by persons or processes, such that entry of a given data element in a given field in a form may be mapped to one or more of categories. Elements in training data may be linked to categories by tags, tokens, or other data elements.

With continued reference to FIG. 1, determining projected carbon block 168 may include receiving projected carbon training data including a plurality of transport routes 156 correlate to a plurality of projected carbon blocks 168. In an embodiment, a particular transport route 156 may indicate a particular projected carbon block 168. In one or more embodiments, projected carbon training data may be input by a user, received from a database 116, retrieved using a web crawler, generated from pervious iterations of the processing and the like. In one or more embodiments, projected carbon data may include previous transport routes 156 as described above. In one or more embodiments, projected carbon training data may include a plurality of transport routes 156 and live map data associated with the transport routes 156 correlated to a plurality of projected carbon blocks 168. In an embodiment, a projected transport route 156 and an associated segment of live map data may indicate a particular projected carbon block 168. In one or more embodiments, carbon projection module 164 may be configured to retrieve transport factors such as construction, road closures and the like wherein an associated projected carbon block 168 may be generated. In one or more embodiments, projected carbon block 168 may be compared to real carbon data 180 and/or elements thereof (as described in further detail below) to iteratively train projection machine learning model 172. In an embodiment, projection machine learning model 172 may be trained based on previously generated projected carbon blocks 168 in comparison to the actual carbon emissions as indicated by previous transport routes 156. In one or more embodiments, projection machine learning model 172 may be trained following each iteration wherein data associated with the actual carbon emissions may be used to train the machine learning model. In one or more embodiments, determining projected carbon block 168 include training projection machine learning model 172 as a function of the projected carbon data. In one or more embodiments, determining projected carbon block 168 includes determining projected carbon block 168 as a function of the projection machine learning model 172. In one or more embodiments, projection machine learning model 172 may be iteratively trained with previous transport routes 156 correlated to previous projected carbon blocks 168.

With continued reference to FIG. 1, processor 108 and/or carbon projection module 164 may determine one or more transport configurations 140 wherein each transport configuration may include the transport carriers 132 that will be used, the transport routes 156 that will be traversed, the temporal elements 144 associated with the transportation of freight, and the like. In addition processor 108 and/or carbon projection module 164 may generate projected carbon emissions 160 for each transport configuration 140. In one or more embodiments, the projected carbon emission 160 may include an estimation of the amount of carbon that will be emitted if a particular transport configuration 140 is selected and/or used. For example, a transport configuration using air travel may be associated with higher projected carbon emissions than a transport configuration utilizing electric vehicles. Additionally or alternatively, in another non limiting example, projected transport journey 152 associated with a first transport configuration 140 may contain an overall shorted distance of miles traveled in comparison to a second transport configuration 140 wherein the projected transport configuration of the first transport configuration 140 may utilize less carbon emissions.

With continued reference to FIG. 1, processor 108 is configured to receive a selection of the one or more transport configurations 140 as a function of user input 184. In one or more embodiments, a user may select a particular transport configuration in which they desire to have their freight shipped on. For example, a user may seek to transport their freight using a cargo aircraft wherein the freight may be received at a final destination sooner. "User input" for the purposes of this disclosure is an input of information made by a user that may be received by processor. For example, user input 184 may include a mouse click wherein the clicking of the mouse may indicate that a selection has been made. In one or more embodiments, user input 184 may include the clicking of a mouse, a selection made through one or more remote devices 136, and the like. In one or more embodiments, processor may be configured to transmit one or more transport configurations 140 to remote device 136 and one or more associated projected carbon emissions 160 to remote device 136 wherein a user may select one of the transport configurations through remote device 136. In one or more embodiments, processor 108 may populate a user interface wherein a user may interact with the user interface.

With continued reference to FIG. 1, processor 108 may be configured to modify a graphical user interface 188 as a function of the one or more transport configurations 140 and the one or more projected carbon emissions 160. In some cases, processor 108 may be configured to create a user interface data structure. As used in this disclosure, "user interface data structure" is a data structure representing a specialized formatting of data on a computer configured such that the information can be effectively presented for a user interface. User interface data structure may include projected carbon emission 160, transport configurations and any other data described in this disclosure.

With continued reference to FIG. 1, processor 108 may be configured to transmit the user interface data structure to the graphical user interface 188. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, others. Processor 108 may transmit the data described above to database 116 wherein the data may be accessed from database 116. Processor 108 may further transmit the data above to a device display or another computing device 104. In one or more embodiments, processor 108 may visually display data to the user through graphical user interface 188. In one or more embodiments, remote device may be communicatively connected to database 116 wherein a user may view graphical user interface 188 through remote device 136.

With continued reference to FIG. 1, apparatus 100 may include a graphical user interface 188 (GUI). For the purposes of this disclosure, a "user interface" is a means by which a user and a computer system interact. For example, through the use of input devices and software. In some cases, processor 108 may be configured to modify graphical user interface 188 as a function of the data described above by populating user interface data structure with transport configuration 140, and/or projected carbon emissions 160 and visually presenting the data modification of the graphical user interface 188. A user interface may include graphical user interface 188, command line interface (CLI), menu-driven user interface, touch user interface, voice user interface (VUI), form-based user interface, any combination thereof and the like. In some embodiments, a user may interact with the user interface using a computing device 104 distinct from and communicatively connected to processor 108. For example, a smart phone, smart tablet, or laptop operated by the user and/or participant. A user interface may include one or more graphical locator and/or cursor facilities allowing a user to interact with graphical models and/or combinations thereof, for instance using a touchscreen, touchpad, mouse, keyboard, and/or other manual data entry device. A "graphical user interface," as used herein, is a user interface that allows users to interact with electronic devices through visual representations. In some embodiments, GUI 188 may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in graphical user interface 188. Persons skilled in the art, upon reviewing the entirety of this disclosure, will be aware of various ways in which a graphical user interface 188 and/or elements thereof may be implemented and/or used as described in this disclosure.

With continued reference to FIG. 1, GUI 188 may contain an interaction component. "Interaction component" for the purposes of this disclosure is a device or a computer program that is capable of allowing a user to interact with GUI 188. Interaction component may include a button or similar clickable elements wherein the clicking of the button may initiate a response or a command. In some cases, interaction component may allow a user to select a transport configuration 140 wherein interaction component may include a text box or clickable buttons that allow a user to make a selection and/or interact with other visual elements. In some cases, interaction component may include visual data such as images, wherein selection of an image may indicate to processor 108 that a selection has been made. In some cases, interaction component may include visual illustrations of each transport configuration wherein selection of the visual illustrations may indicate to processor 108 that a selection has been made. In some embodiments, interaction component may include an event handler. In some cases, event handler may include routine, wherein the routine is a sequence of code that is intended to be called and executed repeatedly when component configuration interface module is running. In a non-limiting example, event handler may include a callback routine, wherein the callback routine may dictate one or more action that follows event. In some cases, event may include a plurality of actions. In other cases, event may involve other interactive devices such as, without limitation, mouse, keyboard, display, headphone, any other interactive device that either electrically and/or communicatively connected to computing device 104, and the like thereof. In a non-limiting example, user may interact with interaction component through performing an event on GUI 188, wherein the event may include user clicking a checkbox present on the visual interface. In some embodiments, event handler may utilize one or more application program interface (API) such as, without limitation, web events and the like thereof. Additionally, or alternatively, event handler may operate any processing step described in this disclosure.

With continued reference to FIG. 1, GUI 188 may be configured to visually present content from one or more logistics providers. Content may include but is not limited to, information associated with the logistics provider, information associated with the transportation of a freight, information associated with the delivery of a freight, information associated with various issues during transportation of the freight and the like. In one or more embodiments, GUI 188 and/or apparatus may configure remote device 136 to display a content viewing portion associated with one or more logistics providers. "Content viewing portion" for the purposes of this disclosure is a portion of GUI and/or a display that is configured to display content. In one or more embodiments, GUI 188 may present multiple content viewing portions wherein each content viewing portion may be associated with a differing logistics provider. In one or more embodiments, content viewing portion may include the website of a logistics providers, information associated with the logistics provider and the like. In one or more embodiments, content viewing portion may be used to show other data separate from data generate by apparatus. For example, content viewing portion may be configured to display data associated with the shipping of freight. In one or more embodiments, an application program interface (API) may be used to receive, processor and/or display information associated with one or more logistics providers. In one or more embodiments, GUI 188 may be configured to visually present content viewing portion wherein a user may view transportation of freight through apparatus. In one or more embodiments, content viewing portion may be instantiated through the select of one or more buttons through GUI 188. In one or more embodiments, content viewing portion may include a popup wherein the popup includes data retrieved from a website of logistics provider. In one or more embodiments, content viewing portion may be used to retrieve data associated with a freight through a single application. In one or more embodiments, apparatus may be configured to generate content viewing portion such that a user may view transportation of a freight through apparatus 100. In one or more embodiments, content viewing portion may be used to display data not generated by apparatus 100. In one or more embodiments, apparatus 100 and/or GUI may be configured to display multiple content viewing portions wherein each content viewing portion may display data associated with transportation of a freight. In one or more embodiments, a first content viewing portion may display live Global positioning system (GPS) data wherein first content viewing portion may be used to view a live location of freight on a map. In one or more embodiments, second content viewing portion may be used to display information associated with freight such as height, weight, dimensions and the like. In one or more embodiments, apparatus 100 may be configured to retrieve data for first content viewing portion and second content viewing portion from one or more websites associated with one or more logistics providers. In one or more embodiments, GUI 188 may be configured to display data from one or more websites associated with freight on a single display. In one or more embodiments, each content viewing portion may split up a display window in GUI 188 into two or more portions. In one or more embodiments, content viewing portions may be generated as a function of interaction with GUI 188. For example, and without limitation, GUI 188 may include a tracking number of freight wherein selection of the tracking number may generate content viewing portion wherein content viewing portion may display tracking information associated with freight. In one or more embodiments, an initial window of GUI 188 may remain unchanged whereas content viewing portion may display new information retrieved from a website associated with logistics provider. In one or more embodiments, content viewing portion may be configured to continuously receive data packets from a server in order to show regularly updated information. In one or more embodiments, content viewing portion may obstruct or obscure GUI 188. In one or more embodiments, content viewing portion may act as a layer on top of GUI 188 wherein GUI 188 may be positioned behind the layer. In one or more embodiments, a user may exit out of content viewing portion to navigate back to GUI 188 or an initial display screen. In one or more embodiments, content viewing portion may include a web browser configured to navigate to servers and/or websites associated with logistics providers. In one or more embodiments, content viewing portion may navigate a user to the website of a logistics provider in order to display information associated with freight. In one or more embodiments, content viewing portion may allow a user to interact with the website, such as through the selection of buttons, scrolling and the like. In one or more embodiments, GUI 188 may contain redirection links wherein selection of redirection links may instantiate content viewing portion. In one or more embodiments, GUI 188 may display tracking numbers associated with freight wherein selection of the tracking numbers may instantiate content viewing portion wherein content viewing portion may display a website containing information associated with the tracking of freight. In one or more embodiments, apparatus 100 may use API to retrieve and display information associated with logistics providers. For example, and without limitations API may allow for receipt of tracking information of freight. In one or more embodiments, apparatus 100 may utilize API to populate GUI 188 with information associated with freight such as tracking numbers, logos associated with logistics providers, websites associated with tracking of freight and the like.

With continued reference to FIG. 1, processor 108 may be configured to modify GUI 188 as function of the one or more transport configurations 140 to generate a graphical view 190. The graphical view 190 may include at least a display element 192 generated as a function of one or more transport configuration 140. A "display element," as used in this disclosure, is an image that a program and/or data structure may cause to be displayed on a display of a device such as display device. Display elements 192 may include, without limitation, windows, pop-up boxes, web browser pages, display layers, and/or any other display element 192 that may occur to a person skilled in the art upon reviewing the entirety of this disclosure. Graphical view 190 includes a first selectable graphic 194 corresponding to a first selectable event handler. A "selectable graphic," as used in this disclosure, is a graphical element that upon selection using a cursor or other locator as manipulated using a locator device such as a mouse, touchscreen, track pad, joystick, or the like will trigger an action to be performed on apparatus 100 and/or computing device 104. In some cases, the actions may include operation of one or more event handlers. In some cases, one or more routines may be executed by an event handler when a selectable graphic 194 is pressed. As a non-limiting example, events and/or routines associated with a selectable graphic 194 may include a redirection link, defined as a hyperlink, button, image, portion of an image, and/or other graphic containing or referring to a uniform resource locator (URL) and/or other resource locator to another graphical view 190 including without limitation buttons, and/or to a process that performs navigation to such URL and/or other resource locator upon selection of selectable event graphic. Redirection may further include redirection to another step of the processing and/or other display windows within apparatus. Redirection may be performed using any event handler, including without limitation event handlers detecting the click of a mouse or other locator, access of redirection link using a touchscreen, the selection of any key, mouseover events, or the like. First selectable graphic 194 is configured to trigger a first action if first selectable graphic 194 is selected. First action may include instructions from processor 108 to select a transport configuration 140 to be used for freight within freight data 120. First action may further include instructions to display information associated with each transport configuration. For example, first action may include instruction to display a 'pop-up window' wherein the pop-up window may display elements 192 of transport configuration 140 such as the transport carriers 132 to be used, the transport routes 156 the temporal element 144 and the like. In some cases, graphical view 190 may include more than one selectable graphics 194 wherein selection of each selectable graphic 194 may trigger an action. In one or more embodiments selectable graphics 194 may be associated with the transport carriers 132 to be used within transport configuration. For example, selectable graphic 194 may include a visual illustration of an aircraft in instances where an aircraft may be used to transport freight. In one or more embodiments, the visual illustrations may be received from database wherein each transport carrier 132 may contain a selectable graphic 194. In one or more embodiments, user input 184 may include selection of the selectable graphic 194 wherein processor 108 may be configured to select the transport configuration to be used in delivery of freight.

With continued reference to FIG. 1, apparatus 100 may further include a display device communicatively connected to at least a processor 108. "Display device" for the purposes of this disclosure, is a device configured to show visual information. In some cases, display device may include a liquid crystal display (LCD), a cathode ray tube (CRT), a plasma display, a light emitting diode (LED) display, and any combinations thereof. Display device may include, but is not limited to, a smartphone, tablet, laptop, monitor, tablet, and the like. Display device may include a separate device that includes a transparent screen configured to display computer generated images and/or information. In some cases, display device may be configured to visually present one or more data through the GUI 188 to a user, wherein a user may interact with the data through GUI 188. In some cases, a user may view GUI 188 through display.

With continued reference to FIG. 1, processor 108 may be configured to transmit freight data 120, transport configuration and/or any other data as described in this disclosure to a logistics provider. "Logistics provider," for the purposes of this disclosure, is an entity that is associated with carrying out the transportation of a freight. For example, logistics provider may include a shipping company, a shipping distributor, a person or entity that specializes in the transport of goods and the like. In one or more embodiments, logistics provider may include an entity that is associated with apparatus 100, such as but not limited to, an entity that utilizes apparatus for logistic operations, an entity that owns apparatus and the like. In one or more embodiments, processor 108 may transmit freight data and selection of transport configuration 140 wherein logistics provider may prepare the freight for shipment. In one or more embodiments, logistics provider and/or processor 108 may update database 116 to indicate that a freight will be shipped. In one or more embodiments, processor 108 may update database to indicate that a portion of a transport carrier 132 has been reserved for the freight within freight data 120. In one or more embodiments, logistics provider may receive freight data 120 and/or transport configuration 140 for proper bookkeeping. In one or more embodiments, a user may select a transport configuration 140 of the one or more transport configurations 140 wherein processor 108 is configured to transmit a selected transport configuration 140 of the one or more transport configurations 140 to logistics provider.

With continued reference to FIG. 1, processor 108 is configured to receive real carbon data 180 as a function of the selected transport configuration 140. In one or more embodiments, processor 108 is configured to receive real carbon data 180 as a function of freight data 120 wherein real carbon data 180 is received based on the transport of a freight associated with freight data 120. "Real carbon data," for the purposes of this disclosure, is data relating to the actual emissions of carbon dioxide associated with transportation of a freight. For example, carbon projection module 164 may generate a projected carbon emission 160 of 10 kg of carbon wherein the actual emissions may be calculated to be 11 kg of carbon. A "greenhouse gas," for the purposes of this disclosure, is a gas that absorbs and emits radiant energy within the thermal infrared range, causing the greenhouse effect. The primary greenhouse gases in Earth's atmosphere are water vapor ($H_2O$), carbon dioxide ($CO_2$), methane ($CH_4$), nitrous oxide ($N_2O$), and ozone ($O_3$). A "greenhouse effect," for the purposes of this disclosure, is a process that occurs when energy from a planet's host star goes through its atmosphere and warms the planet's surface, but the atmosphere prevents the heat from returning directly to space, resulting in a warmer planet. In an embodiment, the real carbon data 180 may be calculated from greenhouse gas data. A "greenhouse gas data," for the purposes of this disclosure, is a metric associated with a pollutant that contributes to the greenhouse effect. A "pollutant," for the purposes of this disclosure, is a substance that degrades environmental quality. In some embodiments, the greenhouse gas data may include, but is not limited to, carbon emissions, water vapor, methane, nitrous oxide, ozone, chlorofluorocarbons, hydrofluorocarbons, perfluorocarbons, and the like. The greenhouse gas data may include measurements associated with the amount of the greenhouse gas generated. In some embodiments, the amount of the greenhouse gas generated may be represented in, but is not limited to, metric tons, pounds, kilograms, cubic meters, and the like. As a non-limiting example, the greenhouse gas data may include data showing 4 metric tons of carbon have been generated by a user. In some embodiments, the greenhouse gas data may include data from one or more pollutant sources. A "pollutant source," for the purposes of this disclosure, is any originating source of a pollutant. In an embodiment, the pollutant source may include, but is not limited to, transport carriers 132, transport carrier 132 emissions, emissions from processes performed by or products manufactured by a transport carrier 132, and the like. A "transport carrier," for the purposes of this disclosure is a machine capable of moving one or more objects between one or more locations. In some embodiments, the transport carrier 132 may include, but is not limited to, a freight carrier, a truck, a car, a boat, a plane, a motorcycle, and the like. In an embodiment, the transport carrier 132 may be configured to operate through, but is not limited to, air, land, sea, and the like. In some embodiments, the transport carrier 132 may be configured to engage in one or more steps of a transport. In another embodiment, a transport carrier 132 may engage in pickup, delivery, and/or line haul operations. In another embodiment, the transport carrier 132 may include, but is not limited to, Less than Truckload ("LTL") and/or Full Truckload ("FTL") freight delivery. In another embodiment, the pollutant source may include, but is not limited to, combustion from boilers. "Boiler", for the purposes of this disclosure, is where thermal energy of fuel is converted to potential energy in a form of steam for later use by a steam engine. In another embodiment, the pollutant source may include, but is not limited to, furnaces, "Furnace", for the purposes of this disclosure, is a source for natural gas heating built inside a vehicle HVAC system.

Still referring to FIG. 1, in some embodiments, the real carbon data 180 may include transportation carbon footprint. "Carbon footprint," for the purposes of the disclosure, is a total greenhouse gas emissions caused by an individual, event, organization, service, place or product. "Transportation carbon footprint," for the purposes of this disclosure, is an indicator that measures greenhouse gas emissions caused by actions related to transportation. "Transportation," for the purposes of disclosure, is movement of goods, services, and/or equipment by a transport carrier 132. The movement of goods may occur via ground, water, air transport, or any combination thereof. As a non-limiting example, the transportation may include transporting full truckload freights from Beijing, China to Massachusetts, the United States. In an embodiment, the transportation carbon footprint may include fuel usage of a transport carrier 132. "Fuel," for the purposes of this disclosure, is a material used to produce heat or power by burning. The fuel may include, but is not limited to, gasoline, diesel, propane, liquefied natural gas, and/or other fuel types. In some embodiments, a transport carrier 132 may use alternative fuel. An "alternative fuel" as used in this disclosure is any energy source generated without a use of fossils. A "fossil" as used in this disclosure is preserved remains of any once-living organism. Alternative fuels may include, but are not limited to, nuclear power, compressed air, hydrogen power, biofuel, vegetable oil, propane, and the like. In the instance of alternative fuel, an energy conversion factor may be included. In some embodiments, an energy conversion factor may include, but is not limited to, gallons to electric equivalent for a hybrid or electric transport carrier 132. The fuel usage of a transport carrier 132, in some embodiments, may include the amount of fuel used over a period of time during a transportation. In some embodiments, the period of time may be the period of time it took to complete a particular transportation. As a non-limiting example, if a transportation took 5 hours to complete, the period of time may correspond to those 5 hours. The fuel usage of a transport carrier 132, as a non-limiting example, may include 4 gallons of fuel for 5 hours driving a transporting truck.

Still referring to FIG. 1, real carbon data 180 may be calculated as a function of the amount of fuel that is consumed. In a non-limiting example, one liter of gasoline, when used as a fuel, produces 2.32 kg (about 1300 liters or 1.3 cubic meters) of carbon dioxide, a greenhouse gas. One US gallon produces 19.4 lb. (1,291.5 gallons or 172.65 cubic feet). Real carbon data 180 also be generated as a function of energy generated from the fuel. In a non-limiting example, the mass of carbon dioxide that is released when one MJ of energy is released from fuel can be estimated to a good approximation. For the chemical formula of diesel, we use as an approximation $C_nH_{2n}$. Note that diesel is a mixture of different molecules. As carbon has a molar mass of 12 g/mol and hydrogen has a molar mass of about 1 g/mol, so the fraction by weight of carbon in diesel is roughly 12/14. The reaction of diesel combustion is given by:

$$2C_nH_{2n}+3nO_2 \rightleftharpoons 2nCO_2+2nH_2O$$

Carbon dioxide has a molar mass of 44 g/mol as it consists of 2 atoms of oxygen (16 g/mol) and 1 atom of carbon (12 g/mol). So, 12 g of carbon yield 44 g of Carbon dioxide. Diesel has an energy content of 42.6 MJ per kg, or 23.47 gram of Diesel contain 1 MJ of energy. Putting everything together the mass of carbon dioxide that is produced by releasing 1 MJ of energy from diesel fuel can be calculated as:

$$23.47 \text{ g} \frac{\text{Diesel}}{\text{MJ}} * \frac{12}{14} * \frac{44}{12} = 74 \text{ g (Carbon Dioxide)}/\text{MJ}$$

For gasoline, with 22 g/MJ and a ratio of carbon to hydrogen atoms of about 6 to 14, the estimated value of carbon emissions for 1 MJ of energy is:

$$22 \text{ g} \frac{\text{gasoline}}{\text{MJ}} * \frac{6*12}{6*12+14*1} * \frac{44}{12} = 67.5 \text{ g (Carbon Dioxide)}/\text{MJ}$$

| Mass of carbon dioxide emitted per quantity of energy for various fuels | | | |
|---|---|---|---|
| Fuel name | $CO_2$ emitted (lbs./$10^6$ Btu) | $CO_2$ emitted (g/MJ) | $CO_2$ emitted (g/kWh) |
| Natural gas | 117 | 50.30 | 181.08 |
| Liquefied petroleum gas | 139 | 59.76 | 215.14 |
| Propane | 139 | 59.76 | 215.14 |
| Aviation gasoline | 153 | 65.78 | 236.81 |
| Automobile gasoline | 156 | 67.07 | 241.45 |
| Kerosene | 159 | 68.36 | 246.10 |
| Fuel oil | 161 | 69.22 | 249.19 |
| Tires/tire derived fuel | 189 | 81.26 | 292.54 |
| Wood and wood waste | 195 | 83.83 | 301.79 |
| Coal (bituminous) | 205 | 88.13 | 317.27 |
| Coal (sub-bituminous) | 213 | 91.57 | 329.65 |

33

-continued

| Mass of carbon dioxide emitted per quantity of energy for various fuels | | | |
| --- | --- | --- | --- |
| Fuel name | $CO_2$ emitted (lbs./$10^6$ Btu) | $CO_2$ emitted (g/MJ) | $CO_2$ emitted (g/kWh) |
| Coal (lignite) | 215 | 92.43 | 332.75 |
| Petroleum coke | 225 | 96.73 | 348.23 |
| Coal (anthracite) | 227 | 97.59 | 351.32 |

Still referring to FIG. 1, in some embodiments, the real carbon data 180 may be detected by a sensor 184 or sensors 184. A "sensor," for the purposes of this disclosure, is a device that is configured to detect an input and/or a phenomenon and transmit information related to the detection. In some embodiments, sensors may be communicatively connected to processor 108. In some embodiments, a sensor 184 may transduce a detected phenomenon and/or characteristic, such as without limitation, temperature, voltage, pressure, and the like, into a sensed signal. Sensors 184 may include one or more sensors 184 which may be the same, similar, or different. In some embodiments, the sensor may include a plurality of sensors 184. The sensor may be a contact or a non-contact sensor. In some embodiments, the sensor may be an encoder. An "encoder," for the purposes of this disclosure, is a sensing device that converts an angular motion or position into analog or digital output signals. Encoders may convert motion to an electrical signal that can be read by some type of control device in a motion control system, such as a counter or PLC. The encoder may send feedback signal that can be used to determine position, count, speed, direction, and the like. The processor 108 may use this information to send a command for a particular function. In one or more embodiments, sensor 184 may include one or more carbon sensors. "Carbon sensor" for the purposes of this disclosure is a sensor configured to detect carbon emissions. For example, sensor may include a non-dispersive infrared (NDIR) $CO_2$ sensor. The real carbon data 180, in some embodiments, may be detected by carbon sensors such as, but not limited to, nondispersive infrared (NDIR) $CO_2$ sensors. The NDIR $CO_2$ sensor may include an infrared (IR) lamp, an optical filter and a detector. The IF detector may read remaining amount of light from the IR lamp that was not absorbed by $CO_2$ molecules, which absorbs 4.26-micron absorption band, or the optical filter. In one or more embodiments, each transport carrier 132 may contain one or more sensors wherein the sensors may be configured to receive real carbon data 180. In one or more embodiments, carbon sensors may include fuel sensors configured to measure a difference in fuel within a fuel storage of transport carrier 132. In one or more embodiments fuel sensors may detect a difference in fuel within fuel storage wherein a certain amount of fuel used may be attributed to a certain amount of carbon emitted. Fuel sensors, may include but are not limited to, optical fuel level sensors, pressure, based sensors, weight-based sensors, voltage sensors, capacitance sensors, and/or any other sensor that may be used to determine a change in fuel consumption.

Still referring to FIG. 1, in some embodiments, the real carbon data 180 may be calculated from operation data. "Operation data," for the purposes of this disclosure, is data relating to the use of a transport carrier 132 by an operator. For the purposes of this disclosure, an "operator" is a person that uses or controls a transport carrier 132. As a non-limiting example, an operator may be a truck driver, a boat pilot, a plane pilot, a biker, a courier and the like. In some embodiments, processor 108 may receive the operation data from database 116. In an embodiment, database 116 may receive operation data 116 from a transport carrier 132. database 116 may receive the operation data, as a non-limiting example, such as fuel consumption of a transport helicopter. "Fuel consumption," for the purposes of this disclosure, is amount of fuel of a vehicle consumed in driving a given distance. In another embodiment, database 116 may receive the operation data from an operator. The database 116 may receive the operation data, as a non-limiting example, such as a type of a vehicle.

Still referring to FIG. 1, in some embodiments, real carbon data 180 may be manually calculated, for example, by a human. In one or more embodiments, real carbon data 180 may be generated from one or more sensors located on one or more transport carriers 132. In one or more embodiments, the one or more transport carriers 132 may include transport carriers 132 within transport configuration 140. In one or more embodiments, the one or more transport carriers 132 may include transport carriers 132 that were responsible for transportation of package. In one or more embodiments, real carbon data 180 may include a calculation of an average of carbon emitted from one or more transport carriers 132 within a particular time frame in which the freight was transported. For example, real carbon data 180 may include an average carbon emitted amongst several transport carriers 132 that operated that day. In one or more embodiments, real carbon data 180 may be generated based on fuel usage of one or more transport carriers 132 that are configured to transport package. In one or more embodiments, processor 108 may adjust real carbon data 180 based on the presence of other goods that are being transported. In one or more embodiments, real carbon data 180 may include a percentage and/or a fraction of the total carbon emitted from one or more transport carriers 132. In one or more embodiments, a fraction of the total carbon emitted may be calculated based on the size of freight (e.g. in comparison to the total space capacity, in comparison to the total volume of the goods being transported and the like), the weight of freight (e.g. weight in comparison to the weight of other goods being transported) and in any other way as described in this disclosure.

In one or more embodiments, real carbon data 180 may include one or more transport routes 156 as described above. In one or more embodiments, one or more location-based sensors and/or devices comprising location-based sensors, such as but not limited to global positioning systems (GPS), Wi-fi sensors, beacons, Bluetooth sensors and/or any other sensor that may be used to determine a position of transport carrier 132. In one or more embodiments, each transport carrier 132 may include one or more remote devices 136, such as a smartphone that may be used to determine a location, speed, and/or distance traveled of one or more transport carriers 132. In one or more embodiments, location-based sensors may be used to determine which transport route 156 and/or which portion of transport route 156 was responsible for an increase or decrease in emissions. In one or more embodiments, the transport routes 156 that contributed to an increase or decrease in real carbon data 180 may be input as a carbon outlier 196. "Carbon outlier" for the purposes of this disclosure is information indicating a reason for a deviation between real carbon data 180 and projected carbon emission. For example, carbon outlier 196 may include a transport route 156 which used more fuel than usual. In one or more embodiments, processor 108 may be configured to determine one or more carbon outliers 196 wherein each carbon outlier 196 is a transport route 156 that utilized more carbon emissions than usual. In one or more embodiments, processor 108 may determine one or more carbon outliers 196 as a function of real carbon data 180 and projected carbon emission 180. In one or more embodiments, processor may use real carbon data 180 form previous iterations to determine an average carbon emission that has been emitted for each transport route. In one or more embodiments, computing device 104 may have a set of preconfigured thresholds wherein exceeding the threshold may designate a transport route as a carbon outlier 196. In one or more embodiments, carbon outlier 196 may be used to determine what the cause of an increase in carbon emissions may be attributed to. In one or more embodiments, carbon outlier 196 may be used to notify an individual why the real carbon emissions of their freight as indicated by real carbon data 180 may have been significantly different from that of projected carbon emission 160. In one or more embodiments, processor 108 may be configured to detect a presence of one or more transport factors in one or more location-based sensors, wherein determining the presence of one or more transport factors may include detecting a slowdown of transport carrier 132 that is uncommon, detecting a complete stopping of transport carrier 132 that is uncommon, detecting an increase in carbon emissions in a particular transport route 156 or a portion thereof from one or more carbon sensors and one or more location based sensors, and the like. In one or more embodiments, processor 108 may use live map data to determine what may be attributed to the slow down, and/or stopping of transport carrier 132. In one or more embodiments, processor 108 may use live map data to determine if and/or what transport factors may have been the cause of the increase in carbon emissions. In one or more embodiments, processor 108 may be configured to use one or more mapping software to determine what transport factors may have occurred on a particular transport route 156 or portion thereof that may be attributed to the increase or decrease in carbon emissions. In one or more embodiments, processor 108 may then generate carbon outlier 196 wherein carbon outlier 196 may include the transport route 156 that is responsible for the increase or decrease in emissions as well as the transport factors that were the cause of the deviation. In one or more embodiments, processor 108 may determine that a speed as received from one or more location-based sensors may be the culprit of an increase in carbon emission as the increase may have bene cause due to the operator or driver's driving habits (e.g. driving too fast or too slowly). In one or more embodiments, real carbon data 180 may include real carbon blocks. "Real carbon block" for the purposes of this disclosure is information associated with the actual carbon emitted for a transport route 156. In an embodiment, real carbon data 180 may include an aggregation of one or more real carbon blocks wherein each real carbon block may include a portion of the total carbon emitted. In one or more embodiments, one or more location-based sensors and one or more carbon sensors may be used to determine the total carbon emitted for a transport carrier 132 over a particular transport route 156. In one or more embodiments, real carbon blocks may be used to determine which transport route 156 was affected by an increase in carbon emission. In one or more embodiments, real carbon blocks may be received in any way as described in this disclosure, such as in reference to real carbon data 180. In one or more embodiments, carbon outlier 196 may include real carbon block and projected carbon block 168. In one or more embodiments, processor may be configured to transmit carbon outlier 196 to remote device 136.

With continued reference to FIG. 1, in one or more embodiments, real carbon blocks may be used to determine which projected carbon blocks 168 were inaccurate. In one or more embodiments, receipt of real carbon blocks may be used to iteratively train carbon projection module 164. In one or more embodiments, real carbon data 180 may be transmitted to a database 116 and input into previous transport routes 156 wherein previous transport routes 156 may include transport routes 156, projected shipping journeys, projected carbon emissions 160, projected carbon blocks 168, real carbon data 180 and/or carbon blocks received from previous iterations. In one or more embodiments, real carbon data 180 may be used to iteratively update variables within carbon projection module 164. In one or more embodiments, real carbon data 180 may be used to iteratively train carbon projection module 164 wherein carbon deviations associated with one or more transport factors may be updated and/or trained. In one or more embodiments, real carbon data 180 may be used as training data wherein training data may comprise inputs such as freight data 120 and outputs may include real carbon data 180. In one or more embodiments, real carbon data 180 may be used to train a machine learning model such as any machine learning model as described in this disclosure. In one or more embodiments, real carbon data 180 may be used to iteratively train carbon projection module 164 and/or iteratively train projection machine learning model 172. In one or more embodiments, independent variable within one or more generated linear equations may be iteratively updated to reflect real carbon data 180 wherein outputs of carbon projection module 164 and/or linear equations, such projected carbon emission 160 may reflect the newly inputted variables. In one or more embodiments, iteratively training carbon projection module 164 may allow for more accurate projected carbon emissions 160. In one or more embodiments, projected carbon blocks 168 may be modified as a function of real carbon data 180 wherein equations, variables and the like associated with projected carbon block 168 may be modified as a function of real carbon data 180 and/or alternatively real carbon block. In one or more embodiments, real carbon data 180 may modify projected carbon block 168 wherein additional elements, variables and the like may affect the outcome of projected carbon block 168 in current and future iterations.

With continued reference to FIG. 1, processor 108 is configured to transmit real carbon data 180 and projected carbon emissions 160 to remote device 136. In one or more embodiments, remote device 136 may include but is not limited to, a smart phone, a smart tablet, a laptop, a desktop computer and/or any other computing device 104 as described in this disclosure. Transmitting may include, and without limitation, transmitting using a wired or wireless connection, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. Processor 108 may transmit the data described above to database 116 wherein the data may be accessed from database 116. Processor 108 may further transmit the data above to a device display or another computing device 104. In one or more embodiments, real carbon data 180 and projected carbon emission 160 may be sent as a text-based message, wherein the text based message include information about projected carbon emission 160 and real carbon data 180 and/or elements thereof. In one or more embodiments, processor 108 may be configured to visually display real carbon data and/or projected carbon emission 160 through GUI 188.

With continued reference to FIG. 1, processor 108 may be configured to generate a carbon departure 198 as a function of real carbon data 180. "Carbon departure" for the purposes of this disclosure is a deviation between the carbon projected in projected carbon emission 160 and the carbon emitted in real carbon data 180. In one or more embodiments, carbon departure 198 may include projected carbon emission 160 and/or real carbon data 180. In one or more embodiments, carbon departure 198 may include a percentage, a fraction and/or any other calculation that may signify or illustrate how accurate projected carbon emissions 160 was in comparison to real carbon data 180. In one or more embodiments, carbon departure 198 may include a standard deviation indicating which standard deviation a calculation was within. In one or more embodiments, carbon departure 198 may be used to determine the accuracy of projected carbon emission 160. In one or more embodiments, carbon temperature may be used to illustrate to a user the accuracy of projected carbon emission 160. In an embodiment, a deviation between projected carbon emission 160 and real carbon data 180 may seem large. However, in contrast to one another, the deviation may seem small. For example, a deviation between projected carbon emission 160 may be 10 kg of Carbon whereas carbon departure 198 may indicate that projected carbon deviation was 98% accurate wherein projected carbon emission 160 was calculated to be 480 kg of carbon emitted and real carbon data 180 indicated that the actual carbon emitted was 490 kg of carbon. In one or more embodiments, carbon departure 198 may be used to illustrate that some error may occur within a calculation, however the errors may be minimal in comparison to the actual result. In one or more embodiments, carbon departure 198 may be transmitted to remote device 136 to illustrate to a user the projected carbon emissions 160 and the actual carbon emissions. In one or more embodiments, GUI 188 may display carbon departure 198 to a user and corresponding information associated with the carbon departure 198, such as but not limited to, information associated with the accuracy of the carbon departure 198 and current and previous iterations. In one or more embodiments, processor 108 may further transmit information, if any, that was the cause of a larger carbon departure 198. For example, processor 108 may detect and/or receive one or more transport factors from live data and transit the factors to a user. In one or more embodiments, processor 108 may display information indicating that the large change in carbon departure 198 may be attributed to one or more transport factors.

Figure 2:
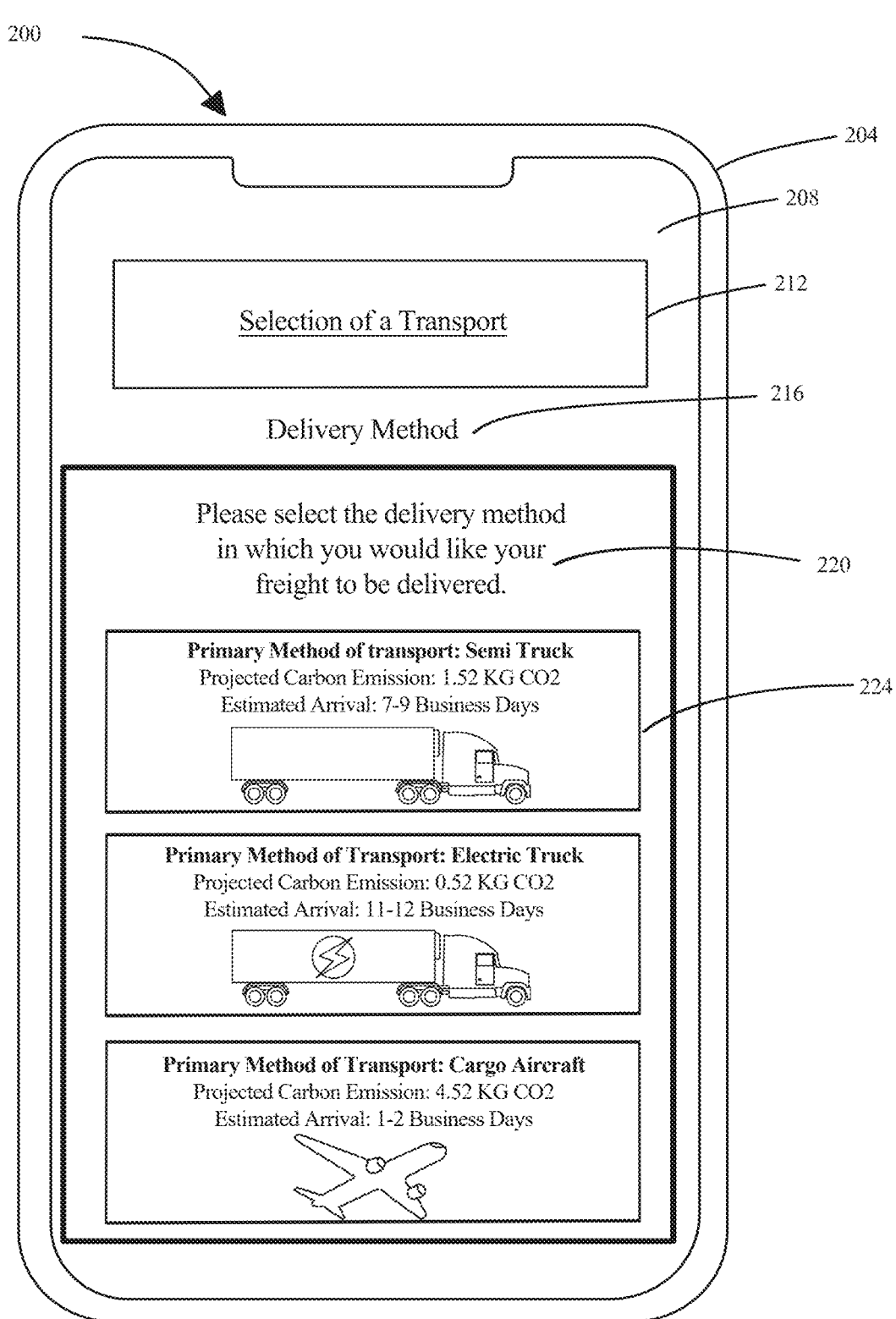
FIG. 2 is an exemplary embodiment of a graphical user interface in accordance with this disclosure.

Referring now to FIG. 2, an exemplary embodiment of a GUI 200 on a display device 204 is illustrated. GUI 200 is configured to receive the user interface structure as discussed above and visually present any data described in this disclosure. Display device 204 may include, but is not limited to, a smartphone, tablet, laptop, monitor, tablet, and the like. Display device 204 may further include a separate device that includes a transparent screen configured to display computer generated images and/or information. In some cases, GUI 200 may be displayed on a plurality of display devices. In some cases, GUI 200 may display data on separate windows 208. A "window" for the purposes of this disclosure is the information that is capable of being displayed within a border of device display. A user may navigate through different windows 208 wherein each window 208 may contain new or differing information or data.

For example, a first window 208 may display information relating to projected carbon emissions, whereas a second window may display information relating to the real carbon data as described in this disclosure. A user may navigate through a first second, third and fourth window (and so on) by interacting with GUI 200. For example, a user may select a button or a box signifying a next window on GUI 200, wherein the pressing of the button may navigate a user to another window. In some cases, GUI may further contain event handlers, wherein the placement of text within a textbox may signify to computing device to display another window. An "event handler" as used in this disclosure is a callback routine that operates asynchronously once an event takes place. Event handlers may include, without limitation, one or more programs to perform one or more actions based on user input 184, such as generating pop-up windows, submitting forms, requesting more information, and the like. For example, an event handler may be programmed to request more information or may be programmed to generate messages following a user input. User input may include clicking buttons, mouse clicks, hovering of a mouse, input using a touchscreen, keyboard clicks, an entry of characters, entry of symbols, an upload of an image, an upload of a computer file, manipulation of computer icons, and the like. For example, an event handler may be programmed to generate a notification screen following a user input wherein the notification screen notifies a user that the data was properly received. In one or more embodiments, user input may include an input of freight data associated with transport request. In one or more embodiments, a user may interact with GUI 200 to input freight data for transport. In some embodiments, an event handler may be programmed to request additional information after a first user input is received. In some embodiments, an event handler may be programmed to generate a pop-up notification when a user input is left blank. In some embodiments, an event handler may be programmed to generate requests based on the user input. In this instance, an event handler may be used to navigate a user through various windows 208 wherein each window 208 may request or display information to or from a user. In this instance, window 208 displays an identification field 212 wherein the identification field signifies to a user, the particular action/computing that will be performed by a computing device. In this instance identification field 212 contains information stating "Selection of a transport" wherein a user may be put on notice that any information being received or displayed will be used to select transport in association with a freight. In one or more embodiments, identification field may indicate the processes that may be performed. For example, processes may include, but are not limited to determination of transport routes, selection of transport configurations and the like. Identification field 212 may be consistent throughout multiple windows 208. Additionally, in this instance, window 208 may display a sub identification field 216 wherein the sub identification field may indicate to a user the type of data that is being displayed or the type of data that is being received. In this instance, sub identification field 216 contains "Delivery method". This may indicate to a user that computing device is showing information associated with delivery methods. Additionally, window 208 may contain a prompt 220 indicating the data that is being described in sub identification field 216 wherein prompt 220 is configured to display to a user the data that is currently being received and/or generated. In this instance, prompt 220 notifies a user that in the current window 208 the user is tasked with selecting a transport. In one or more embodiments, GUI 200 may contain one or more selectable graphics 224 wherein each selectable graphic 224 may be associated with a transport configuration and a projected carbon emission as described in reference to FIG. 1. In one or more embodiments, a user may select a selectable graphic 224 wherein selection of the selectable graphic may be used to transport freight. In one or more embodiments, a user may choose between transportation configuration to select a desirable transportation configuration. In one or more embodiments, GUI may continuously notify user of various updates within the delivery such as updates including shipment to various centers, stops along the way and the like. In one or more embodiments, GUI 200 may display transport routes and associated carbon emissions with those routes.

Figure 3:
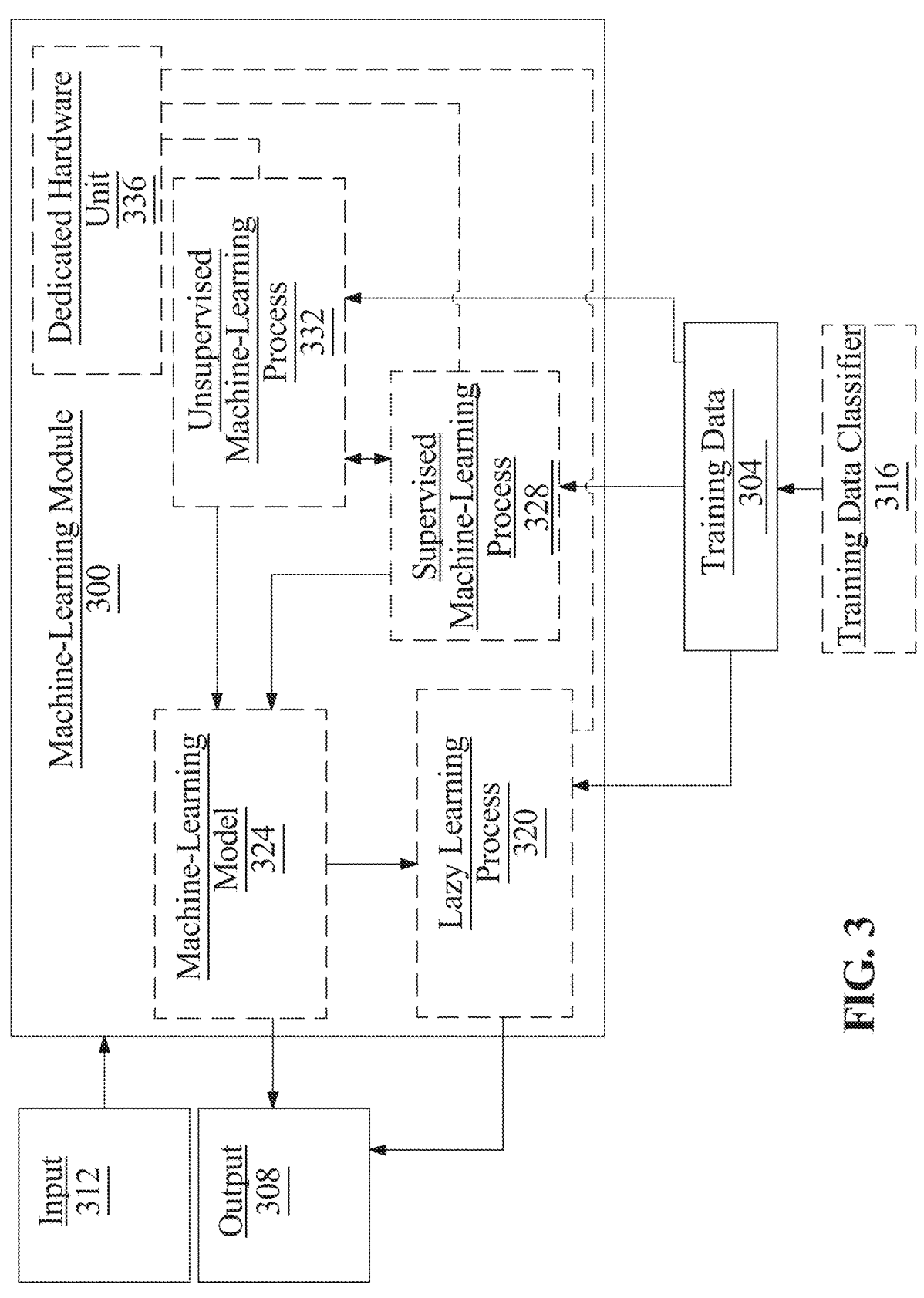
FIG. 3 is a block diagram of exemplary embodiment of a machine learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example inputs may include transport routes and outputs may include projected carbon blocks.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to categorizations such as transport categorization as described above. In one or more embodiments, elements of training data may be classified to route categorizations wherein route categorization may include highways, city streets, urban city streets, rural city streets, private streets, states, and the like. In an embodiment, route categorization allow for quicker processing as computing device is limited to a smaller number of outputs. In an embodiments, classification may allow for increased accuracy wherein only outputs classified to the same input may be used.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs such as transport routes as described above as inputs, outputs such as projected carbon blocks as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the clastic net model, a multi-task clastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
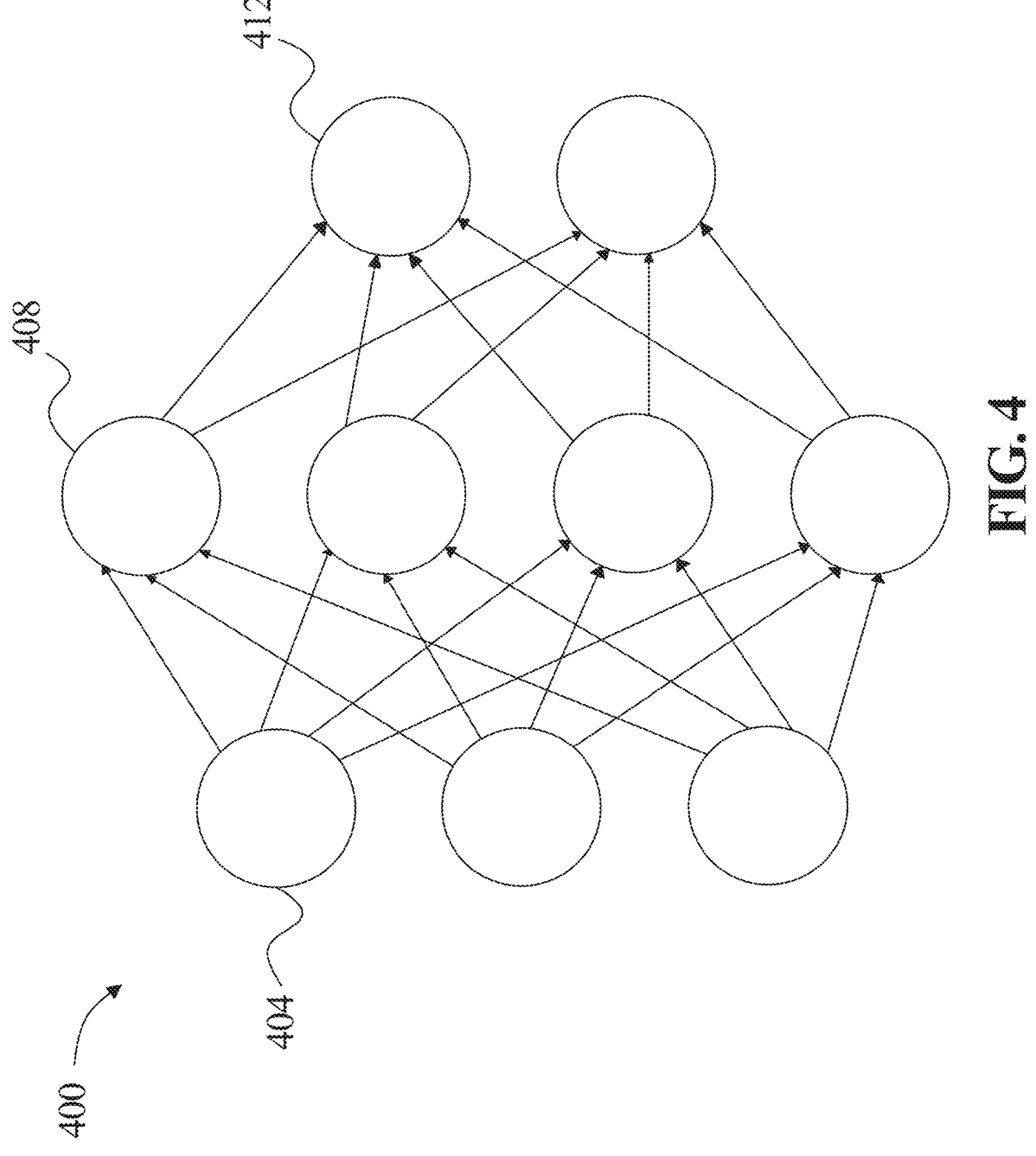
FIG. 4 is a diagram of an exemplary embodiment of a neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
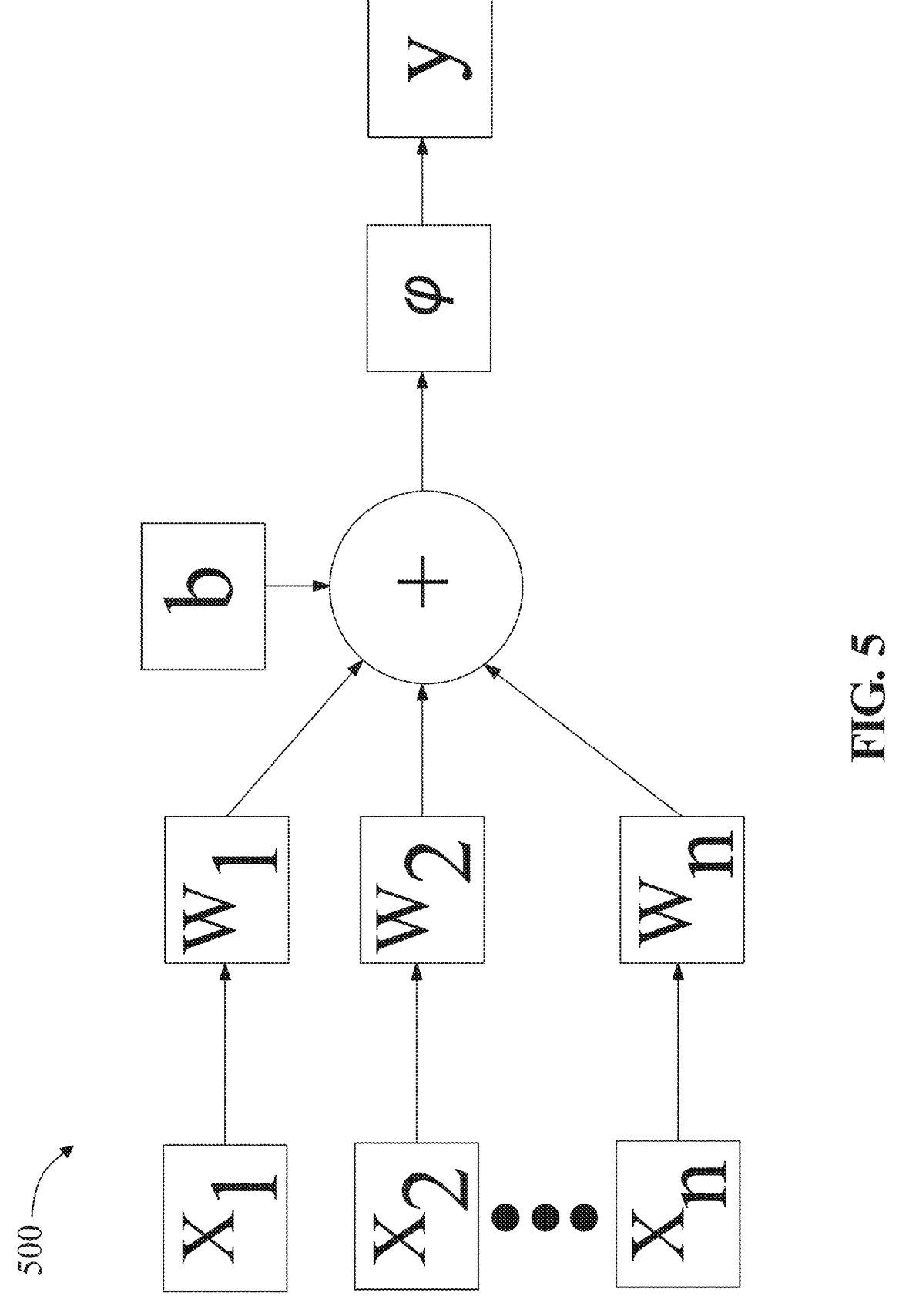
FIG. 5 is a block diagram of an exemplary embodiment of a node of a neural network.

Referring now to FIG. 5, an exemplary embodiment of a node 500 of a neural network is illustrated. A node may include, without limitation a plurality of inputs x; that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \begin{cases} \alpha(e^x - 1) & \text{for } x < 0 \\ x & \text{for } x \geq 0 \end{cases}.$$

Fundamentally, there is no limit to the nature of functions of inputs x; that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights w; may be determined by training a neural network using training data, which may be performed using any suitable process as described above.

Figure 6:
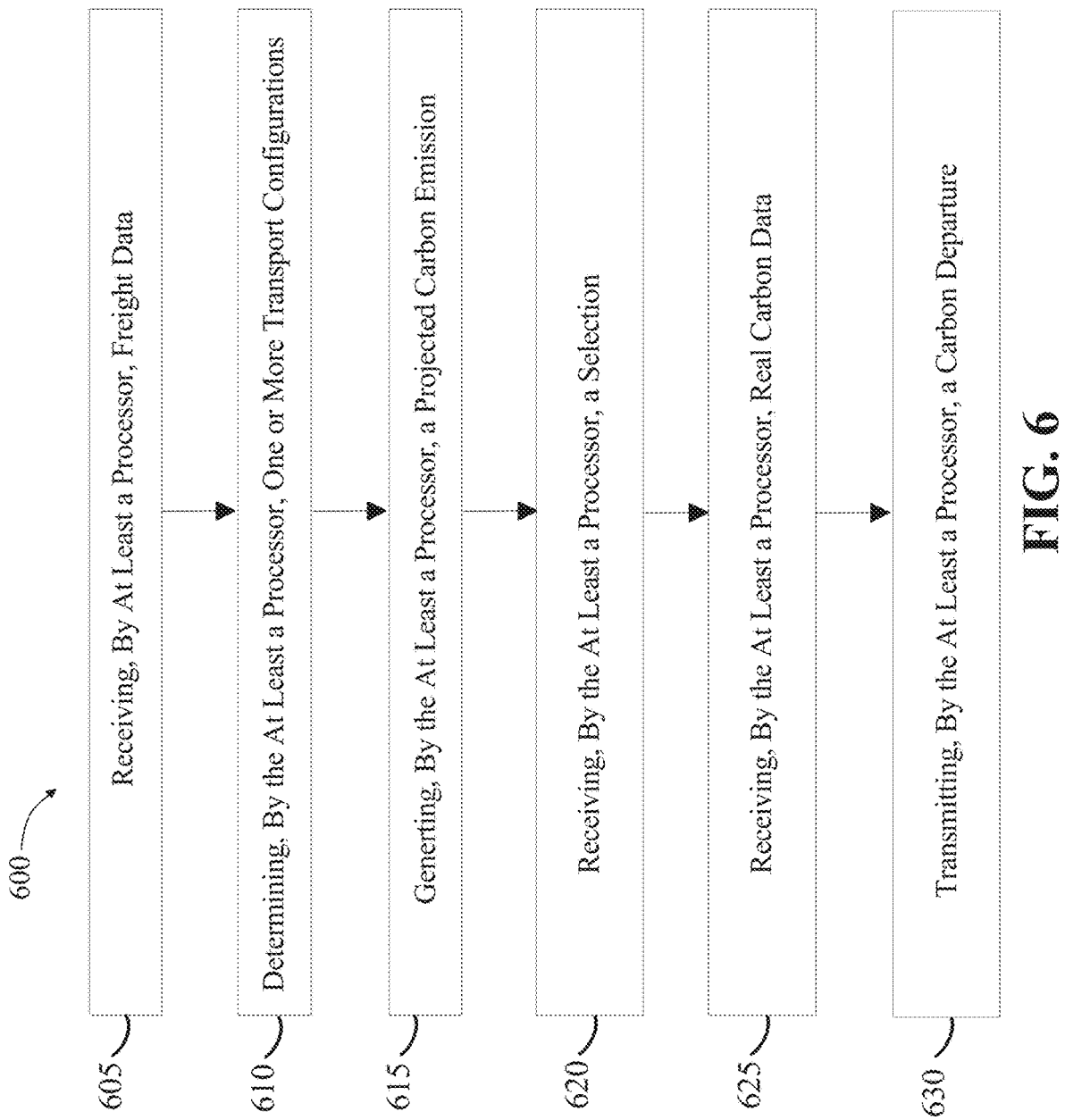
FIG. 6 is a flow diagram illustrating an exemplary embodiment of a method for selection of a transport.

Referring now to FIG. 6, a method 600 for projected carbon emissions is described. At step 605, method 600 include receiving, by at least a processor, freight data for an order for transport. In one or more embodiments, the freight data includes physical attribute data. This may be implemented with reference to FIGS. 1-6 and without limitation.

With continued reference to FIG. 6, at step 610, method 600 includes determining, by the at least a processor, one or transport configurations as a function of the freight data, wherein each of the one or more transport configurations includes a temporal element. In one or more embodiments, determining, by the at least a processor, the one or more transport configurations as a function of the freight data includes comparing the physical attribute data to one or more transport thresholds. In one or more embodiments, determining, by the at least a processor, the one or more transport configuration includes generating a projected transport journey. In one or more embodiments, generating, by the at least a processor, the one or more transport configurations as a function of the freight data includes generating the transport configuration as a function of the projected transport journey. In one or more embodiments, the one or more transport configurations includes at least a first transport configuration and a second transport configuration the temporal element of the first transport configuration differs from the temporal element of the second transport configuration. This may be implemented with reference to FIGS. 1-6 and without limitation.

With continued reference to FIG. 6, at step 615, method 600 includes generating, by the at least a processor, a projected carbon emission for each transport configuration of the one or more transport configurations as a function of the freight data and a carbon projection module. In one or more embodiments, generating, by the at least a processor, the projected carbon emission includes receiving a plurality of transport routes, determining a projected carbon block for each transport route of the plurality of transport routes. And generating the projected carbon emissions as a function of the plurality of projected carbon blocks. In one or more embodiments, determining, by the at least a processor, the projected carbon block for each transport route includes receiving projected carbon training data having a plurality of transport routes correlated to a plurality of projected carbon blocks. training a projection machine learning mode as a function of the projected carbon training data and determining a projected carbon block as a function of the projection machine learning model, wherein the projection machine learning model is iteratively trained with previous transport routes correlated to a previous projected carbon block. In one or more embodiments, determining the projected carbon block for each transport route further includes modifying the projected carbon block as a function of the real carbon data. In one or more embodiments, generating the projected carbon emission for the transport configuration as a function of the freight data and the carbon projection module further includes receiving live map data from one or more data providers and generating the projected carbon emission as a function of the live map data. This may be implemented with reference to FIGS. 1-6 and without limitation.

With continued reference to FIG. 6, at step 620 method 600 includes receiving, by the at least a processor, a selection of the one or more transport configurations as a function of user input. In one or more embodiments, receiving, by the at least a processor, the selection of the one or more transport configurations includes s transmitting, by the at least a processor, a selected transport configuration of the one or more transport configurations to a logistics provider. In one or more embodiments, receiving, by the at least a processor, the selection of the one or more transport configurations includes modifying a graphical user interface as a function of the one or more transport configurations and the one or more projected carbon emissions and receiving, by the at least a processor, a selection of one or more transport configurations through the graphical user interface as a function of the user input. In one or more embodiments, receiving, by the at least a processor, the selection of the one or more transport configurations as a function of the user input includes modifying a graphical user interface as a function of the one or more transport configurations and the one or more projected carbon emissions to generate a graphical view, wherein the graphical view includes at least a display element generated as a function of the one or more transport configurations and a selectable graphic corresponding to a first selectable event handler, wherein the first selectable event handler is configured to trigger a first action if the first selectable graphic is selected. This may be implemented with reference to FIGS. 1-6 and without limitation.

With continued reference to FIG. 6, at step 625, method 600 includes receiving, by the at least a processor, real carbon data associated with the freight data from one or more sensors located on one or more transport carriers as a function of the selection. In one or more embodiments the one or more sensors include one or more carbon sensors. This may be implemented with reference to FIGS. 1-6 and without limitation.

With continued reference to FIG. 6, method 600 may further include transmitting, by the at least a processor, the real carbon data and the projected carbon emissions to a remote device. In one or more embodiments, the method further includes generating, by the at least a processor, a carbon departure as a function of the real carbon data and the projected carbon emission and transmitting, by the at least a processor, the carbon departure to the remote device. This may be implemented with reference to FIGS. 1-6 and without limitation.

With continued reference to FIG. 6, at step 630 method 600 includes transmitting, by the at least a processor, a carbon departure as a function of the real carbon data and the projected carbon emission to a remote device. in one or more embodiments, method 600 may further include iteratively training, by the at least a processor, the carbon projection module as a function of the real carbon data. In one or more embodiments, method 600 may further include determining, by the at least a processor, one or more carbon outliers as a function of the real carbon data. This may be implemented with reference to FIGS. 1-6 and without limitation.

It is to be noted that any one or more of the aspects and embodiments described herein may be conveniently implemented using one or more machines (e.g., one or more computing device 104s that are utilized as a user computing device 104 for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device 104) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory 112 "ROM" device, a random access memory 112 "RAM" device, a magnetic card, an optical card, a solid-state memory 112 device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory 112. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device 104) and any related information (e.g., data structures and data) that causes the machine to perform any one of the methodologies and/or embodiments described herein.

Examples of a computing device 104 include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device 104 may include and/or be included in a kiosk.

Figure 7:
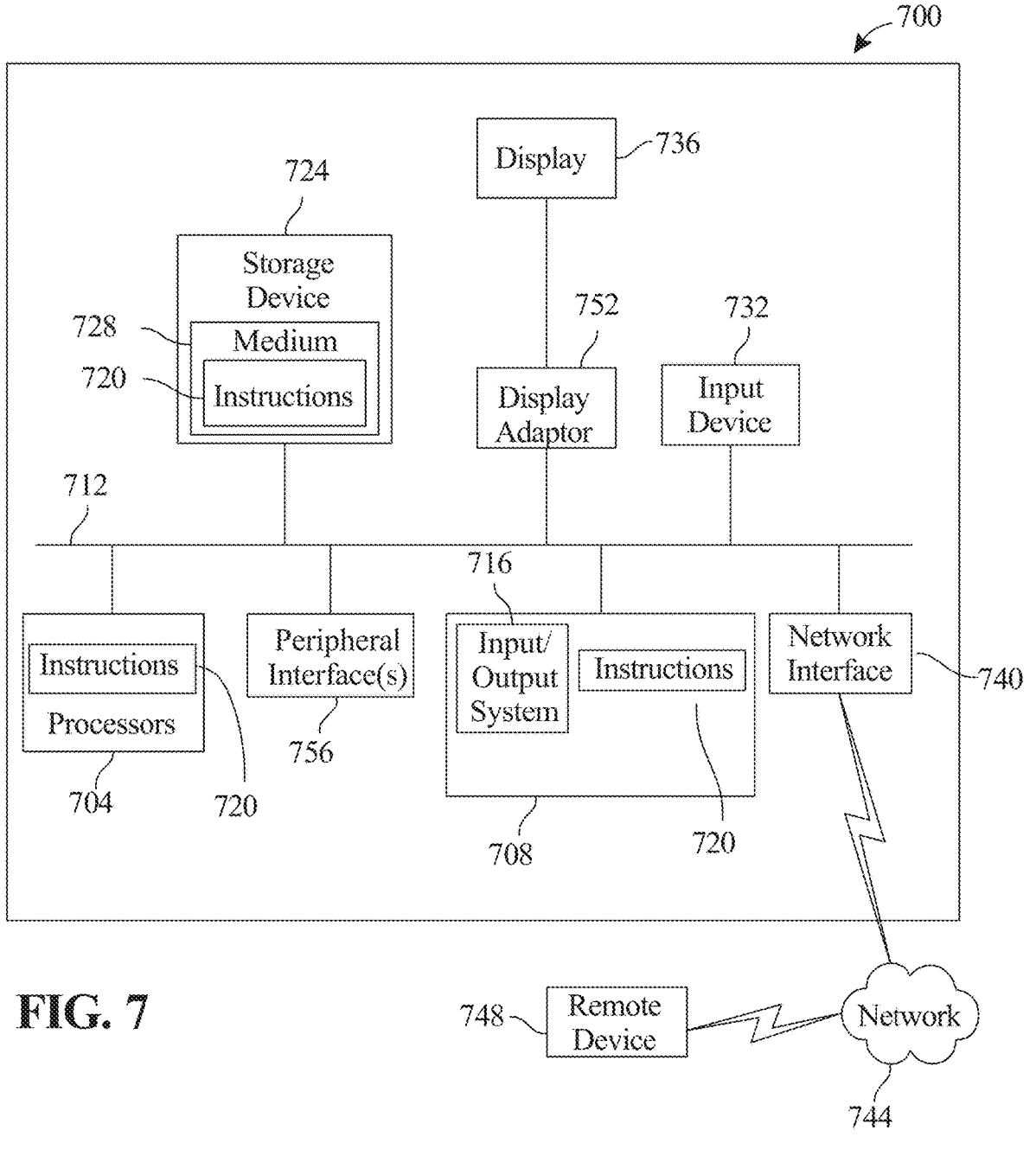
FIG. 7 is a block diagram of a computing system that can be used to implement any one or more of the methodologies disclosed herein and any one or more portions thereof.

FIG. 7 shows a diagrammatic representation of one embodiment of a computing device 104 in the exemplary form of a computer system 700 within which a set of instructions for causing a control system to perform any one or more of the aspects and/or methodologies of the present disclosure may be executed. It is also contemplated that multiple computing device 104s may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory 112 bus, a memory 112 controller, a peripheral bus, a local bus, and any combinations thereof, using any of a variety of bus architectures.

Processor 704 may include any suitable processor 108, such as without limitation a processor 108 incorporating logical circuitry for performing arithmetic and logical operations, such as an arithmetic and logic unit (ALU), which may be regulated with a state machine and directed by operational inputs from memory 112 and/or sensors; processor 704 may be organized according to Von Neumann and/or Harvard architecture as a non-limiting example. Processor 704 may include, incorporate, and/or be incorporated in, without limitation, a microcontroller, microprocessor 108, digital signal processor 108 (DSP), Field Programmable Gate Array (FPGA), Complex Programmable Logic Device (CPLD), Graphical Processing Unit (GPU), general purpose GPU, Tensor Processing Unit (TPU), analog or mixed signal processor 108, Trusted Platform Module (TPM), a floating point unit (FPU), system on module (SOM), and/or system on a chip (SoC).

Memory 708 may include various components (e.g., machine-readable media) including, but not limited to, a random-access memory 112 component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory 112 device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIRE-WIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 136 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing device 104$s$, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, apparatuses and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for projected carbon emissions of a transport, the apparatus comprising:
    at least a processor; and
    a memory communicatively connected to the at least a processor, the memory containing instructions configuring the processor to:
    receive freight data associated with a transport request;
    determine one or more transport configurations as a function of the freight data, wherein each transport configuration of the one or more transport configurations comprises a temporal element based on a projected transport journey having one or more transport routes;
    retrieve a plurality of previously collected data for the one or more transport routes and a list of drivers corresponding to the one or more transport routes;
    generate a carbon projection module, wherein the carbon projection module utilizes the plurality of previously collected data to determine what an increase or decrease in carbon emissions is attributable to;
    generate a projected carbon emission for each transport configuration of the one or more transport configurations as a function of the freight data using the carbon projection module, wherein generating the projected carbon emission comprises:
        receiving the one or more transport routes associated with a projected transport journey;
        determining a projected carbon block for each transport route of the one or more transport routes using historical route data; and
        generating the projected carbon emission for each transport configuration of the one or more transport configurations as a function of the projected carbon block for each transport route of the one or more transport routes associated with a projected transport journey;
    generate a carbon deviation as a function of the projected carbon emission for each transport configuration of the one or more transport configurations and route obstruction data;
    apply the carbon deviation to the projected carbon emission for each transport configuration of the one or more transport configurates; and
    output an integrated projected carbon emission for each transport configuration of the one or more transport configurations.

2. The apparatus of claim 1, wherein determining a projected carbon block for each transport route of the one or more transport routes comprises:

determining a carbon emission for each of one or more transport carriers associated with a transport route using historic route data;
generating an average of the carbon emissions for each of the one or more transport carriers associated with a transport route; and
generating a projected carbon block as a function of the average of the carbon emissions for each of the one or more transport carriers associated with a transport route.

3. The apparatus of claim 2, wherein determining a carbon emission for each of the one or more transport carriers associated with a transport route comprises calculating the carbon emission based on an average energy consumption.

4. The apparatus of claim 1, wherein determining the projected carbon block for each transport route comprises:
    instantiating a projection machine-learning model;
    inputting the one or more transport routes into the projection machine-learning model;
    generating, at the projection machine-learning model, a projected carbon block for each of the one or more transport routes; and
    outputting the projected carbon blocks for each of the one or more transport routes to a requesting party.

5. The apparatus of claim 4, wherein instantiating the projection machine-learning model comprises:
    receiving projected carbon training data comprising a plurality of transport routes correlated to a plurality of projected carbon blocks;
    training a projection machine learning model as a function of the projected carbon training data; and
    determining the projected carbon block as a function of the projection machine learning model, wherein the projection machine learning model is iteratively trained with transport routes correlated to carbon blocks.

6. The apparatus of claim 5, wherein the projection machine-learning model is configured to generate a linear regression for each transport route, wherein one or more known variables are input into a linear regression equation to generate a plurality of projected carbon blocks.

7. The apparatus of claim 6, wherein the one or more known variables comprises a plurality of historic traffic data.

8. The apparatus of claim 6, wherein the one or more known variables comprises a plurality of live map data from one or more data providers.

9. The apparatus of claim 6, wherein the one or more known variables comprises transport route variables, wherein transport route variables comprise one or more of elevation data, geographic data, population density data, or road work data.

10. The apparatus of claim 1, wherein the at least a processor is further configured to display, at a display device, the projected carbon emission for each transport configuration, wherein the projected carbon emission for each transport configuration is segmented into the one or more transport routes associated with a transport configuration comprising the projected carbon block.

11. A method for projected carbon emissions of a transport, the method comprising:
    receiving freight data associated with a transport request;
    determining one or more transport configurations as a function of the freight data, wherein each transport configuration of the one or more transport configurations comprises a temporal element based on a projected transport journey having one or more transport routes;

retrieving a plurality of previously collected data for the one or more transport routes and a list of drivers corresponding to the one or more transport routes;

generating a carbon projection module, wherein the carbon projection module utilizes the plurality of previously collected data to determine what an increase or decrease in carbon emissions is attributable to;

generating a projected carbon emission for each transport configuration of the one or more transport configurations as a function of the freight data using the carbon projection module, wherein generating the projected carbon emission comprises:

receiving the one or more transport routes associated with a projected transport journey;

determining a projected carbon block for each transport route of the one or more transport routes using historical route data; and generating the projected carbon emission for each transport configuration of the one or more transport configurations as a function of the projected carbon block for each transport route of the one or more transport routes associated with a projected transport journey;

generating a carbon deviation as a function of the projected carbon emission for each transport configuration of the one or more transport configurations and route obstruction data;

applying the carbon deviation to the projected carbon emission for each transport configuration of the one or more transport configurates; and outputting an integrated projected carbon emission for each transport configuration of the one or more transport configurations.

12. The method of claim 11, wherein determining a projected carbon block for each transport route of the one or more transport routes comprises:

determining a carbon emission for each of one or more transport carriers associated with a transport route using historic route data;

generating an average of the carbon emission for each of the one or more transport carriers associated with a transport route; and generating a projected carbon block as a function of the average of the carbon emissions for each of the one or more transport carriers associated with a transport route.

13. The method of claim 12, wherein determining a carbon emission for each of the one or more transport carriers associated with a transport route comprises calculating the carbon emission based on an average energy consumption.

14. The method of claim 11, wherein determining the projected carbon block for each transport route comprises:

instantiating a projection machine-learning model inputting the one or more transport routes into the projection machine-learning model;

generating, at the projection machine-learning model, a projected carbon block for each of the one or more transport routes; and outputting the projected carbon blocks for each of the one or more transport routes to a requesting party.

15. The method of claim 14, wherein instantiating the projection machine-learning model comprises:

receiving projected carbon training data comprising a plurality of transport routes correlated to a plurality of projected carbon blocks;

training a projection machine learning model as a function of the projected carbon training data; and determining the projected carbon block as a function of the projection machine learning model, wherein the projection machine learning model is iteratively trained with transport routes correlated to carbon blocks.

16. The method of claim 15, wherein the projection machine-learning model is configured to generate a linear regression equation for each transport route, wherein one or more known variables are input into the linear regression equation to generate a plurality of projected carbon blocks.

17. The method of claim 16, wherein the one or more known variables comprises a plurality of historic traffic data.

18. The method of claim 16, wherein the one or more known variables comprises a plurality of live map data from one or more data providers.

19. The method of claim 16, wherein the one or more known variables comprises transport route variables, wherein transport route variables comprise one or more of elevation data, geographic data, population density data or road work data.

20. The method of claim 11, wherein the method further comprises displaying, at a display device, the projected carbon emission for each transport configuration, wherein the projected carbon emission for each transport configuration is segmented into the one or more transport routes associated with a transport configuration comprising the projected carbon block.

* * * * *